United States Patent
Lopes et al.

(10) Patent No.: US 11,395,218 B2
(45) Date of Patent: *Jul. 19, 2022

(54) SYSTEMS AND METHODS FOR PROVIDING CELLULAR COMMUNICATION IN A NETWORK OF MOVING THINGS, FOR EXAMPLE INCLUDING A NETWORK OF AUTONOMOUS VEHICLES

(71) Applicant: Veniam, Inc., Mountain View, CA (US)

(72) Inventors: Diogo Lopes, Aveiro (PT); Tiago Condeixa, Aveiro (PT); Ricardo Matos, Oporto (PT)

(73) Assignee: VENIAM, INC., Mountain View, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 16/572,185

(22) Filed: Sep. 16, 2019

(65) Prior Publication Data
US 2020/0015156 A1 Jan. 9, 2020

Related U.S. Application Data

(63) Continuation of application No. 15/854,172, filed on Dec. 26, 2017, now Pat. No. 10,433,243.

(60) Provisional application No. 62/465,461, filed on Mar. 1, 2017.

(51) Int. Cl.
*H04W 48/18* (2009.01)
*H04W 4/40* (2018.01)
*H04L 67/12* (2022.01)
*H04W 88/10* (2009.01)
*H04W 24/02* (2009.01)

(52) U.S. Cl.
CPC ............ *H04W 48/18* (2013.01); *H04L 67/12* (2013.01); *H04W 4/40* (2018.02); *H04W 24/02* (2013.01); *H04W 88/10* (2013.01)

(58) Field of Classification Search
CPC ....... H04W 48/18; H04W 4/40; H04W 24/02; H04W 88/10; H04L 67/12
See application file for complete search history.

(56) References Cited

U.S. PATENT DOCUMENTS

| 9,521,606 | B1 | 12/2016 | Costa et al. | |
| 10,433,243 | B2* | 10/2019 | Lopes | H04W 48/18 |
| 2013/0301584 | A1* | 11/2013 | Addepalli | H04W 8/08 |
| | | | | 370/329 |

(Continued)

OTHER PUBLICATIONS

Notification of Transmittal; International Search Report and the Written Opinion of The International Searching Authority, or the Declaration dated May 4, 2018 corresponding to International Patent Application No. PCT/US2018/016173.

*Primary Examiner* — Siming Liu
(74) *Attorney, Agent, or Firm* — McAndrews, Held & Malloy, Ltd.

(57) ABSTRACT

Systems and methods for integrating and exploiting the availability of multiple communication technologies in a network of moving things, for example including a network of autonomous vehicles. As a non-limiting example, various aspects of this disclosure provide for the flexible utilization of one or more communication pathways available to nodes in a vehicle network based, at least in part, on real-time context.

22 Claims, 15 Drawing Sheets

(56) References Cited

U.S. PATENT DOCUMENTS

2015/0381927 A1 12/2015 Mourning
2017/0346542 A1 11/2017 Neves

* cited by examiner

SYSTEMS AND METHODS FOR PROVIDING CELLULAR COMMUNICATION IN A NETWORK OF MOVING THINGS, FOR EXAMPLE INCLUDING A NETWORK OF AUTONOMOUS VEHICLES

CROSS-REFERENCE TO RELATED APPLICATIONS/INCORPORATION BY REFERENCE

This patent application is a continuation of U.S. patent application Ser. No. 15/854,172, filed Dec. 26, 2017, and titled "Systems and Methods for Integrating and Exploiting the Availability of Multiple Communication Technologies in a Network of Moving Things, for Example Including a Network of Autonomous Vehicles," expected to issue as U.S. Pat. No. 10,433,243; which makes reference to, claims priority to, and claims benefit from U.S. Provisional Patent Application Ser. No. 62/465,461, filed on Mar. 1, 2017, and titled "Systems and Methods for Integrating and Exploiting the Availability of Multiple Communication Technologies in a Network of Moving Things, for Example Including a Network of Autonomous Vehicles; each of which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; U.S. Provisional Application Ser. No. 62/299,269, titled "Systems and Methods for Automating and Easing the Installation and Setup of the Infrastructure Supporting a Network of Moving Things," filed on Feb. 24, 2016; and U.S. Provisional Patent Application No. 62/439,257, filed on Dec. 27, 2016, and titled "Systems and Methods for the Flexible Support of Multi-Homing in a Network of Moving Things," each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
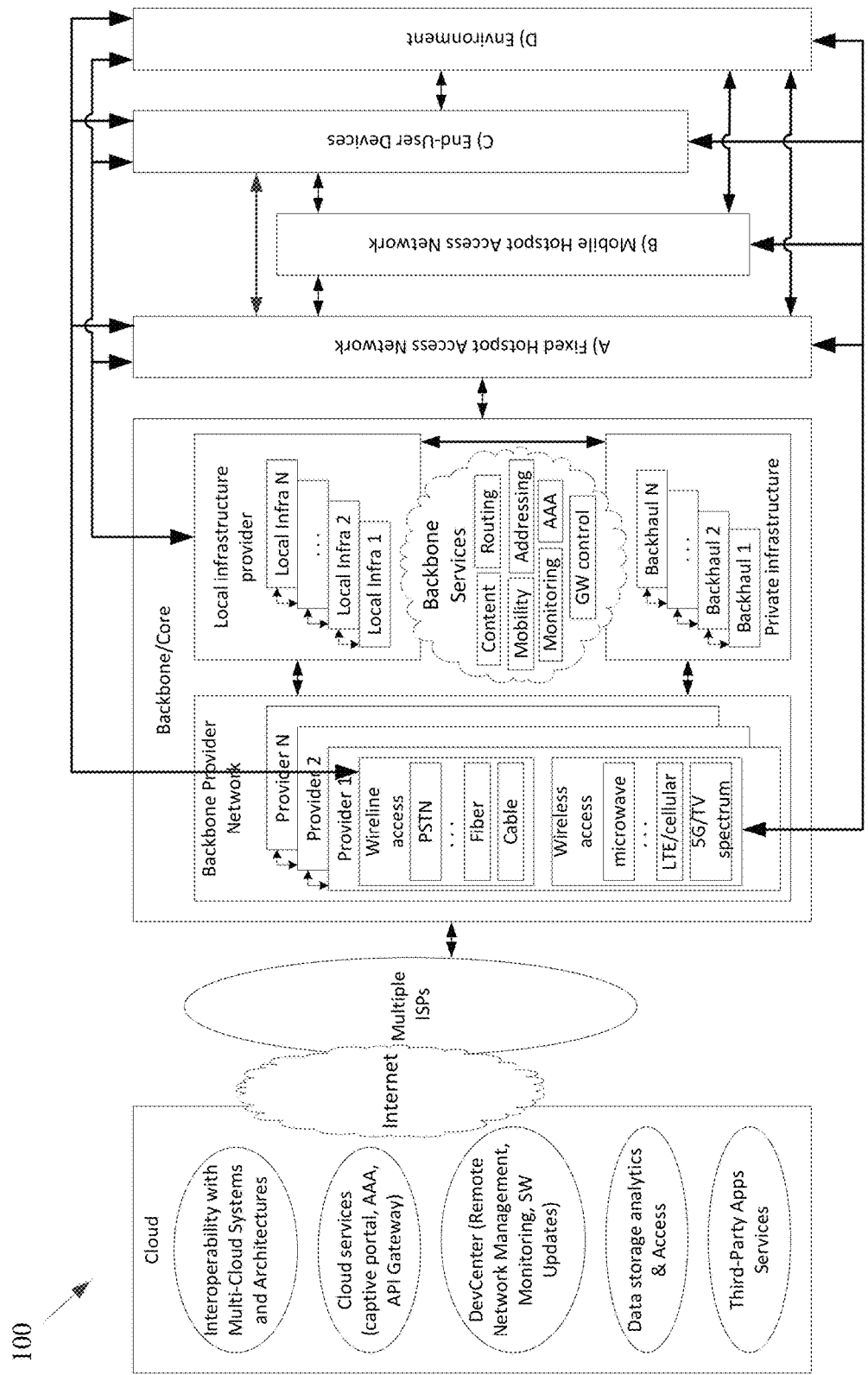
FIG. 1 shows a block diagram of a communication network, in accordance with various aspects of this disclosure.

Various aspects of this disclosure provide systems and methods for integrating and exploiting the availability of multiple communication technologies in a network of moving things, for example including a network of autonomous vehicles. As a non-limiting example, various aspects of this disclosure provide for the flexible utilization of one or more communication pathways available to nodes in a vehicle network based, at least in part, on real-time context.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, method steps, nodes, node components, networks, and/or network components 200, 300, 400, 500-570, 600, 700, 800, 900, 1000, 1100, 1200, 1300, 1400, and 1500, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
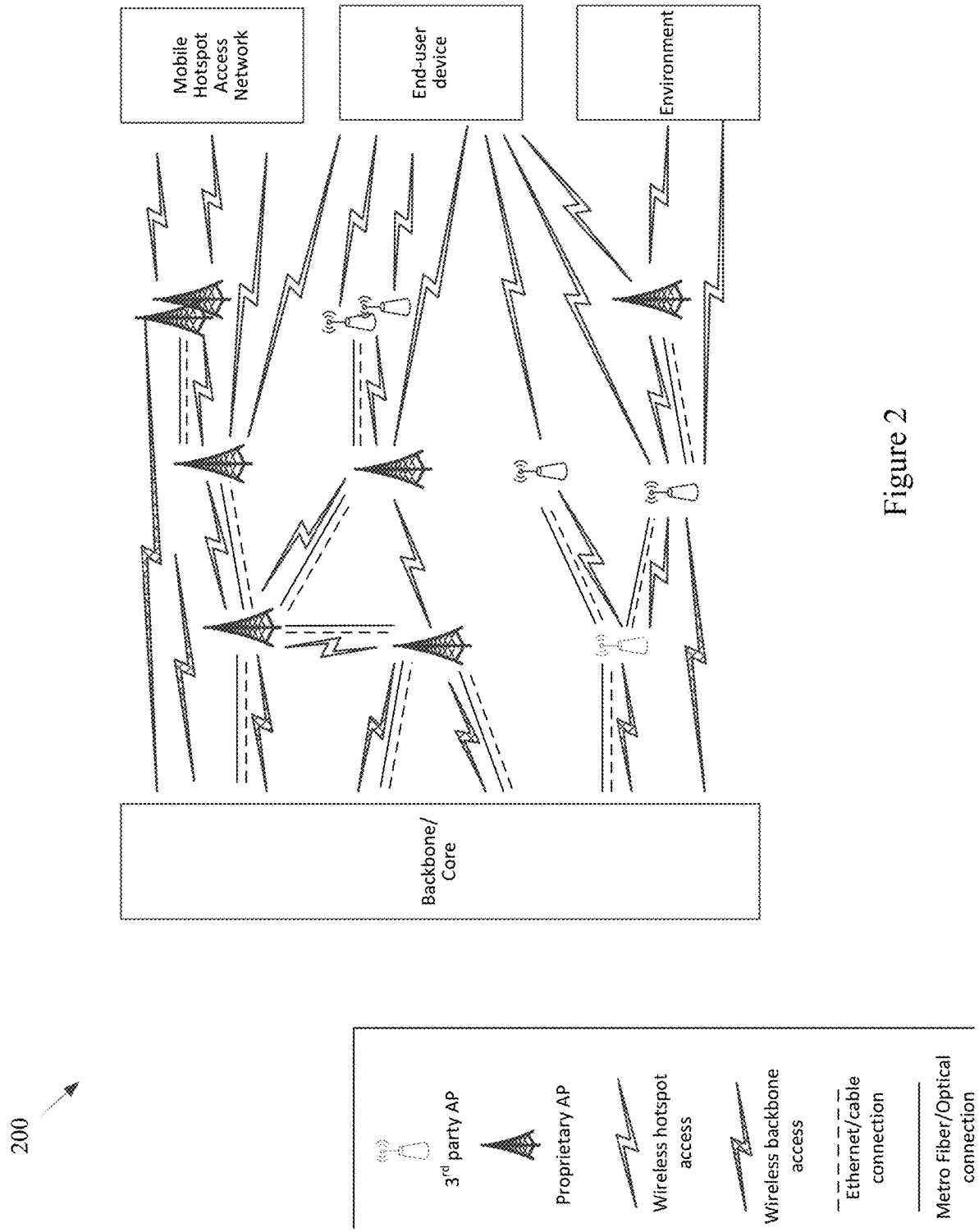
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, method steps, nodes, node components, networks, and/or network components 100, 300, 400, 500-570, 600, 700, 800, 900, 1000, 1100, 1200, 1300, 1400, and 1500, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
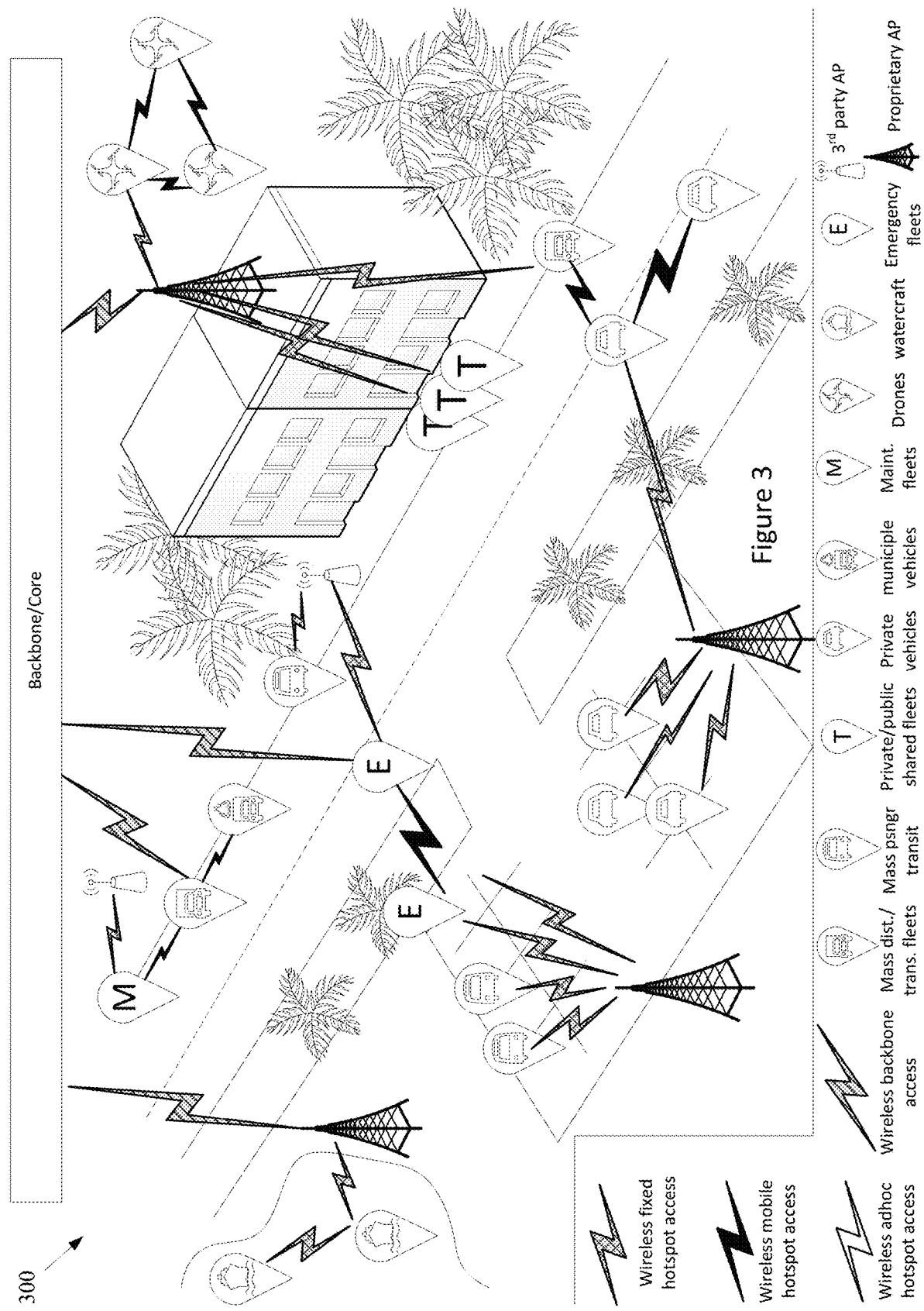
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, method steps, nodes, node components, networks, and/or network components 100, 200, 400, 500-570, 600, 700, 800, 900, 1000, 1100, 1200, 1300, 1400, and 1500, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
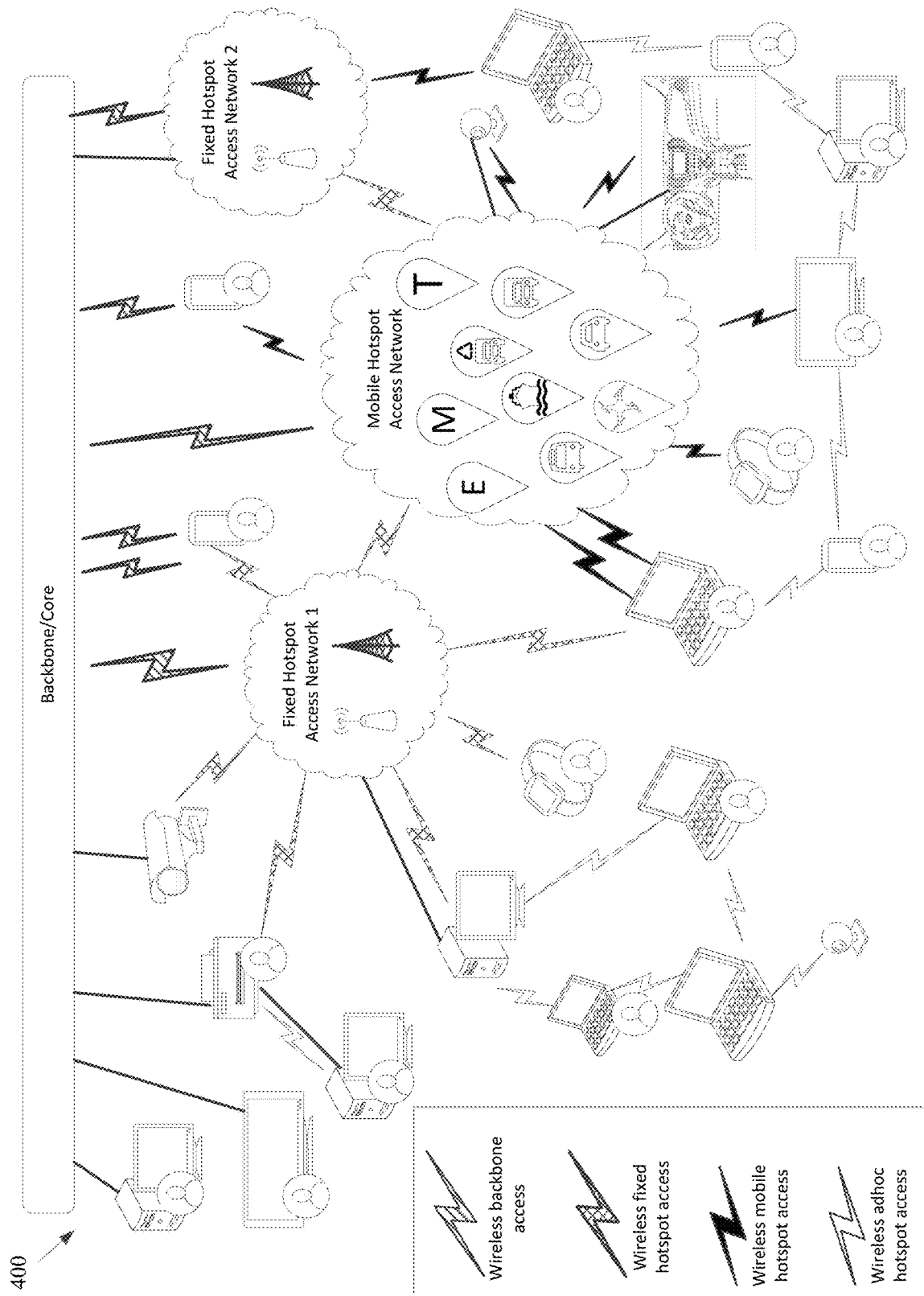
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, method steps, nodes, node components, networks, and/or network components 100, 200, 300, 500-570, 600, 700, 800, 900, 1000, 1100, 1200, 1300, 1400, and 1500, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
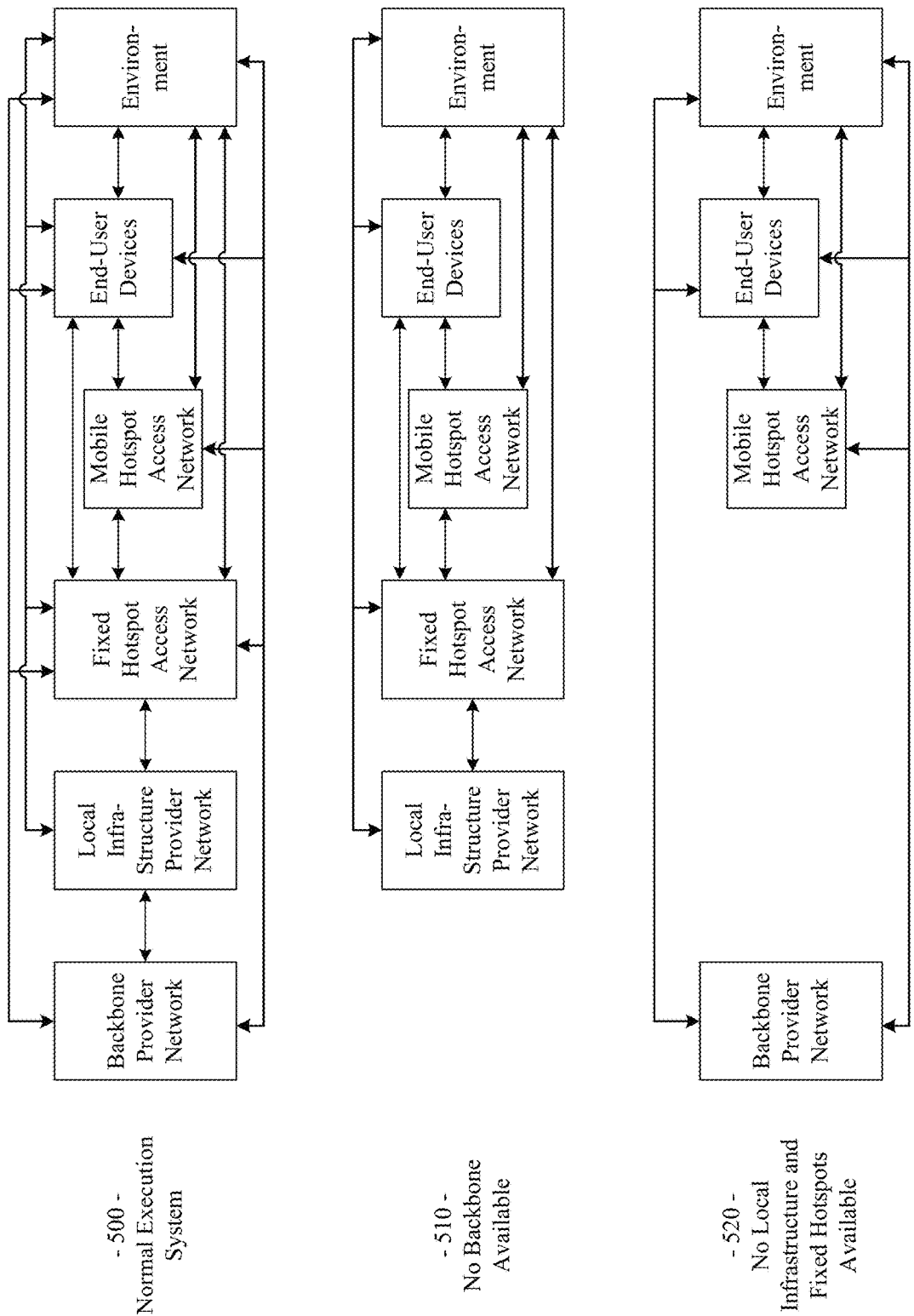
FIGS. 5A-5C show a plurality of network configurations illustrating the flexibility and/or and resiliency of a communication network, in accordance with various aspects of this disclosure.
Figure 5B:
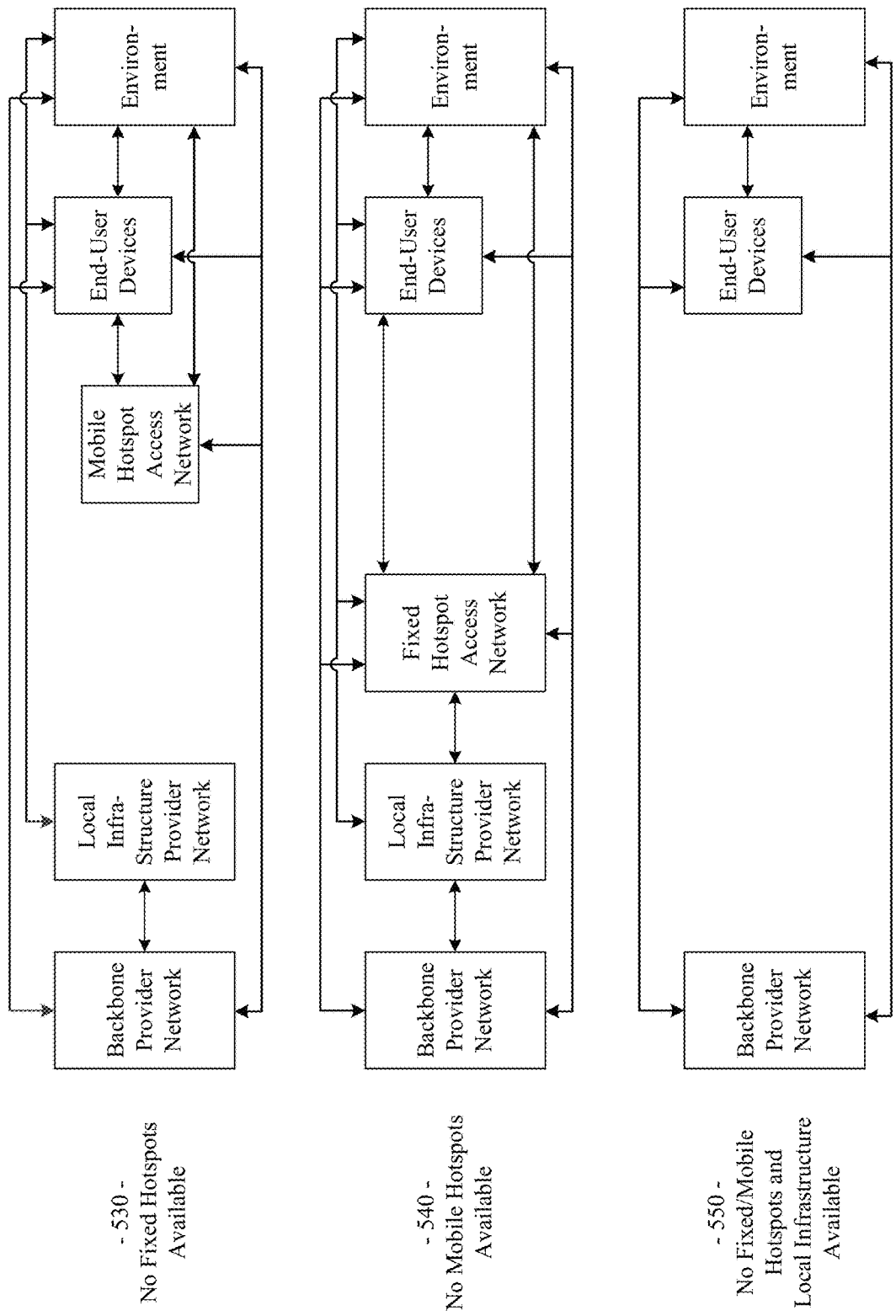
Figure 5C:
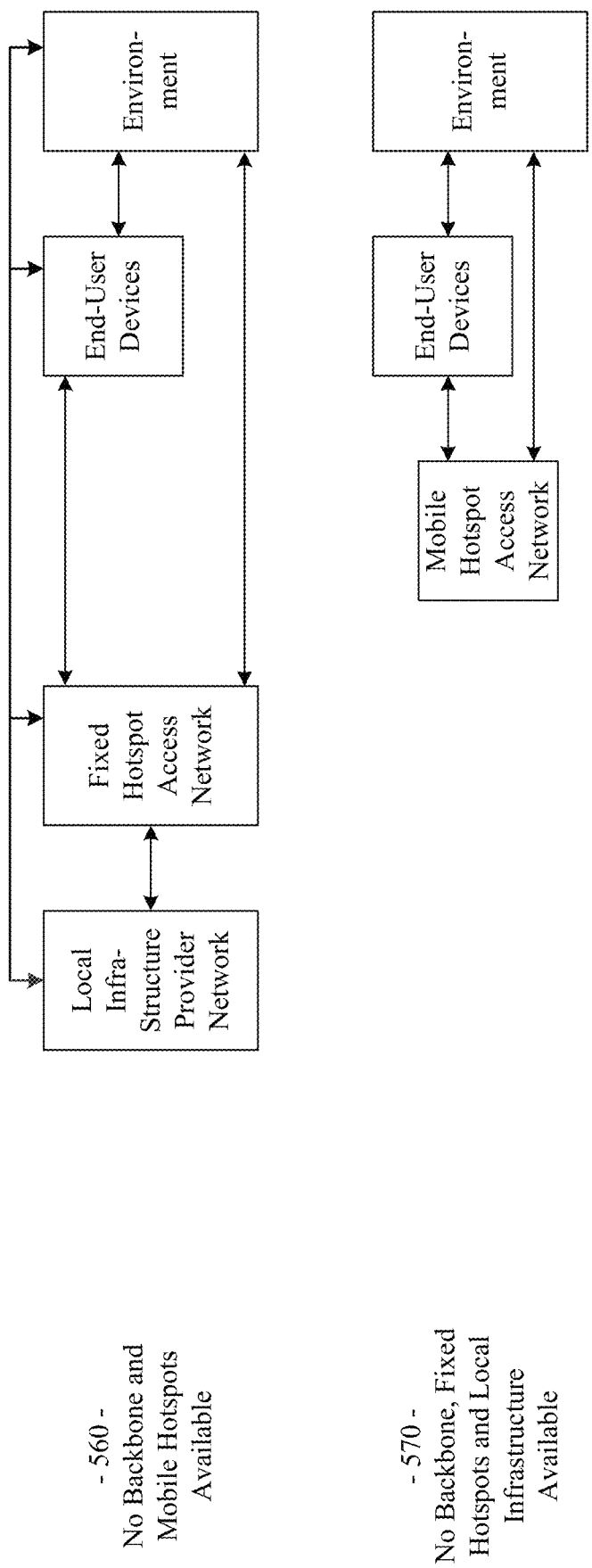

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, method steps, nodes, node components, networks, and/or network components 100, 200, 300, 400, 600, 700, 800, 900, 1000, 1100, 1200, 1300, 1400, and 1500, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
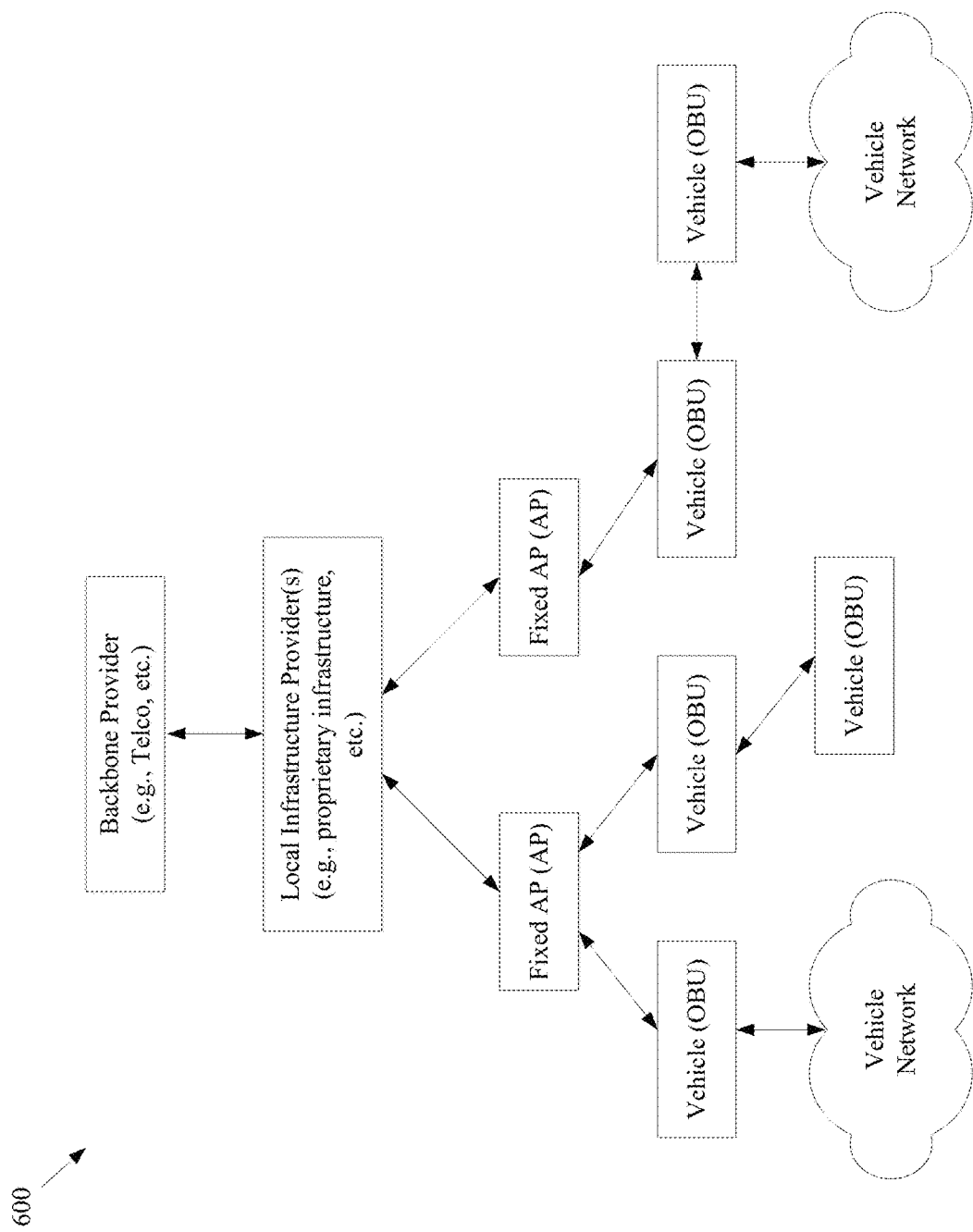
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, method steps, nodes, node components, networks, and/or network components 100, 200, 300, 400, 500-570, 700, 800, 900, 1000, 1100, 1200, 1300, 1400, and 1500, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Figure 7:
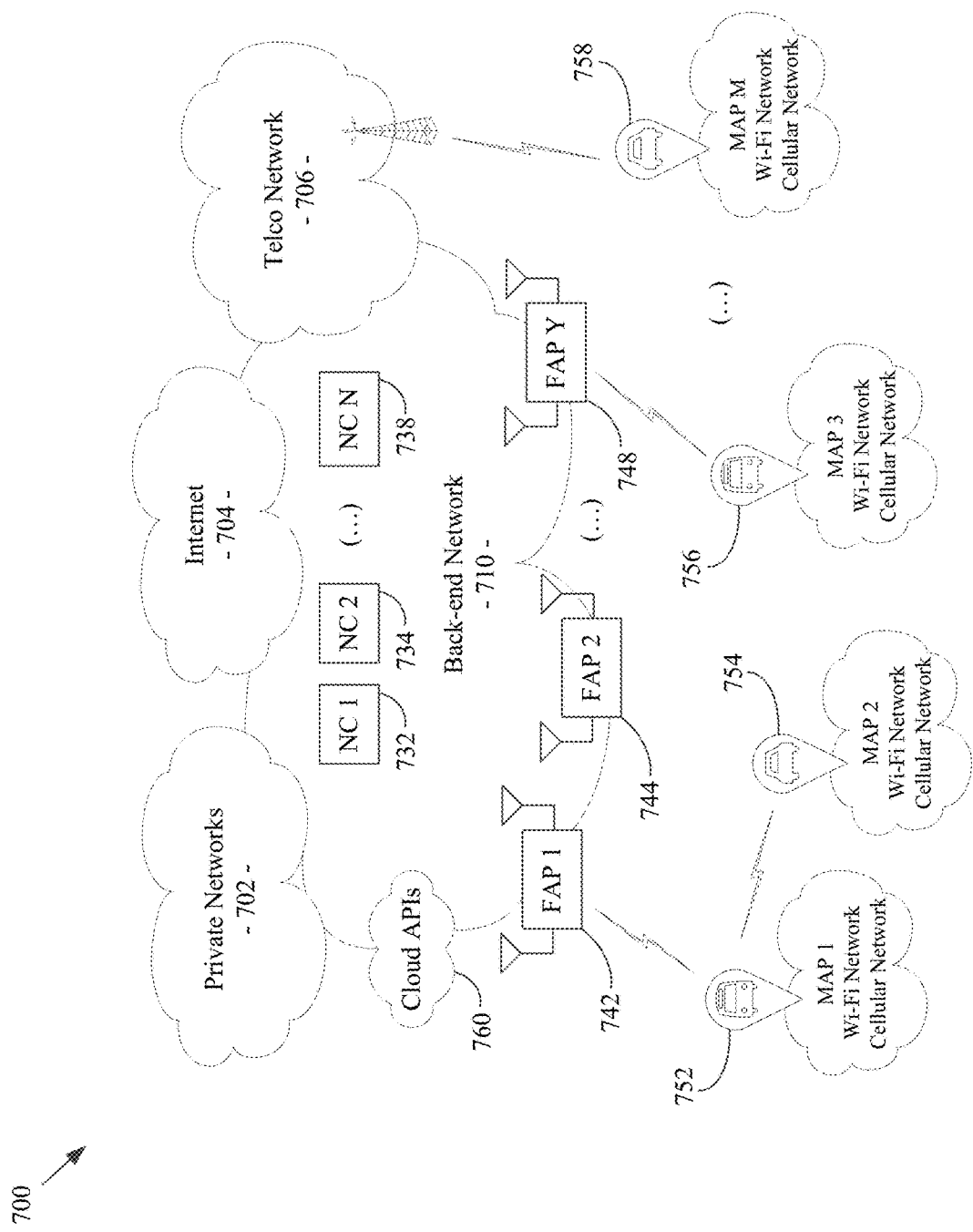
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, method steps, nodes, node components, networks, and/or network components 100, 200, 300, 400, 500-570, 600, 800, 900, 1000, 1100, 1200, 1300, 1400, and 1500, discussed herein. Notably, the example network 700 shows a plurality of vehicles (or Mobile APs, or OBUs), each communicatively coupled to a Fixed AP (or RSU), where each Mobile AP may provide network access to a vehicle network (e.g., comprising other vehicles or vehicle networks, user devices, sensor devices, etc.), for example a Wi-Fi network to which end user devices may connect, with which communication with sensors may be performed, with which communication with control circuitry may be performed, etc. Each Mobile AP (or MAP, or OBU) may also provide cellular network connectivity, for example between the Mobile AP and the cellular network, between the Mobile AP and user cellular-capable devices, etc. For example, each Mobile AP may operate as a cellular network picocell and/or femtocell (pico/femtocell) base station (e.g., depending on the number of cellular connections to be supported and the desired communication range). The Mobile APs (or vehicles in which the Mobile APs are installed) may also, for example, have access to information from any of a wide array of sensors (e.g., cameras, microphones, gas or particle sensors, weather sensors, impulse sensors or accelerometers, velocity sensors, slip detectors, temperature sensors, position or location sensors, moisture detectors, pressure sensors, weight sensors, door or lid sensors, etc.). The Mobile APs may also, for example, have access to any of a variety of sensors and/or processors that measure network conditions or performance (e.g., Signal-to-noise ratio, signal strength, channel loading or utilization, quality of service, etc.). The Mobile APs may, for example, gather (or collect) information from such sensors, make various autonomous decisions based at least in part on the gathered information, communicate such information to controllers (e.g., local and/or central access point positioning systems, controllers of vehicles, central network controllers and/or databases, etc.), etc. Many non-limiting examples of such operation are provided herein.

A vehicle network may be connected (e.g., communicatively coupled, directly or indirectly) to one or more local user devices, any of the variety of sensors discussed herein, etc. The vehicle network may, for example, comprise any or all of the nodes discussed herein. For example, the vehicle network may comprise one or more Network Controllers (NCs) (e.g., NC 1 732, NC 2 734, . . . , NC N 738, etc.), one or more Fixed APs (e.g., FAP 1 742, FAP 2 744, . . . , FAP Y 748, etc.), one or more Mobile APs (e.g., MAP 1 752, MAP 2 754, MAP 3 756, . . . , MAP M 758, etc.), etc. Such nodes may, for example, be communicatively coupled in any of the manners discussed herein. Note that, as discussed herein, a Mobile AP (e.g., as shown at example MAP 1 752 of FIG. 7) may at times connect to the network (e.g., to any node thereof) via a hard link (e.g., via wire, via an optical fiber (or tether), etc.). Such a link may, for example, be utilized when a Mobile AP (or a vehicle thereof) is parked, and the Mobile AP is operating as a Fixed AP.

As shown in FIG. 7, the network of moving things may comprise a plurality of vehicles, each with one or more respective local vehicle networks that may be coupled to other vehicle networks, user devices (e.g., smart phones, personal computing devices, smart watches, scanners, etc.), smart containers or cargo systems comprising any of a variety of sensors (e.g., container sensors, environmental sensors, position sensors, inertial sensors, cameras, microphones, temperature sensors, humidity sensors, gas and/or particle sensors, weight sensors, light sensors, etc.), sensors apart from containers (e.g., container sensors, environmental sensors, position sensors, inertial sensors, cameras, microphones, temperature and/or infrared sensors, humidity sensors, gas and/or particle sensors, weight sensors, etc.), vehicle control sensors (e.g., engine sensors, temperature sensors, road condition sensors, speed sensors, location sensors, shock sensors, vibration sensors, obstacle and/or collision avoidance sensors, driver characteristic sensors, etc.), etc.

In modern communication systems, for example based on 5G, it may be beneficial to integrate all of the communication technologies available, for example to exploit and aggregate resources from different available connections. There may, for example, be mobile devices with various interfaces associated with different respective technologies. In such a scenario, a primary goal of a communication network may comprise ensuring that those devices (or users thereof) have acceptable (or good) Quality of Service (QoS) and/or Quality of Experience (QoE) when connected to the Internet, independent of the wireless access technology and/or infrastructure or backhaul technology being utilized. Flexible utilization of the multiple technologies available in the Mobile APs (or OBUs) and/or the Fixed APs (or RSUs) may, for example, allow the network to overcome scenarios of network congestion, interference, and dead-zones. There are also various scenarios in which the same technology of the same provider can be used to improve the management and the scalability of the network. There are additionally various scenarios in which different providers of the same technology may be utilized, for example as an on-demand and/or fault-back connection.

Regarding the particular use-case of LTE, even though the cellular technologies such as LTE have a relatively high communication range (e.g., relatively to DSRC and Wi-Fi technologies), cellular networks still have dead zones (e.g., in urban canyons, in rural areas, etc.) and the available cell capacity varies substantially with the number of users. Thus, for example in an urban setting, the QoE may be severely degraded in areas with higher population density. On the other hand, unlicensed wireless spectrum technologies such as DSRC and Wi-Fi have relatively low deployment costs and relatively lower latencies (e.g., relative to cellular technologies), but also have relatively lower range. Such relatively lower range may, for example, result in relatively higher (or more frequent) dead-zone occurrence, but may improve the range capacity since not as many people can be connected to the same AP at the same time.

Telecommunication companies or Wi-Fi providers that already have their cellular/LTE or AP infrastructures deployed can leverage having low-cost multi-tech devices at the edge (e.g., at or near boundaries of coverage areas, etc.), for example Mobile APs and/or Fixed APs as discussed herein, that can fill their needs without increasing costs on networking infrastructure and/or the overhead of managing traffic received from other technologies.

Regarding DSRC communication, in high congestion and/or interference locations, for example due to a large number of devices/MAPs within the same area, the device can start transmitting information received from V2X/V2V (vehicle-to-everything/vehicle-to-vehicle) DSRC communications by encapsulating such information through the cellular network and, as an example, uploading such information to Cloud, and then distributing such information to the other vehicles in the area via the cellular network again (or through any network discussed herein), overcoming the connection issues that would affect the connectivity if the device had just used DSRC-based links/networks.

Various aspects of this disclosure provide the systems and methods to integrate multiple technologies, for example exploiting all of the resources available in the different technologies and networks, to optimize the overall communication solution. The systems and methods to integrate all of the available technologies overcome, among other things, scenarios of congestion, interference, dead zones, etc. Additionally, by integrating the vehicular network, the systems and methods improve the quality and resilience of the provider (e.g., cellular, etc.) network, expand the wireless coverage of the provider network (e.g., with small cells spread over the MAPs and FAPs), etc.

By combining, for example, both cellular technology (or other cellular-based technology) and DSRC (and/or other wireless-based technology, for example Wi-Fi, etc.), the systems and methods disclosed herein provide a comprehensive communication solution that addresses weak points of each individual network by leveraging the strong points of the other network(s). Note, as discussed herein, the respective weak points and strong points of the individual networks may be dynamic, for example dynamically changing as a function of context (e.g., as a function of any one or more of geographical location, time of day, day of week, weather, emergency conditions, traffic conditions, user congregations, planned or unplanned events, etc.).

In an example scenario, cellular dead zones can be addressed (or compensated) by deploying pico/femtocells (e.g., that travel with a vehicle) connected through DSRC or Wi-Fi hotspots available in the area. Similarly, network capacity may be improved. For example the cell size of the pico/femtocells is much smaller than the cell size of the regular base stations, and therefore the clients being served by the smaller cell may generally experience better QoE. Additionally, the movement of clients out of the service of a regular base station and into the service of the pico/femtocell may also improve the QoE of the remaining users being served by the regular base station. Since the DSRC link latency may generally be substantially lower than a typical cellular link latency, users using pico/femtocells and DSRC technology may experience substantially less latency than when using a regular cell and the cellular network. In another example scenario, DSRC dead zones, or zones with high congestion and/or interference on the wireless links, can be addressed (or compensated) by using a cellular connection to fill the gaps in coverage (or acceptable coverage) between the DSRC APs, therefore improving the user QoE.

In accordance with various aspects of this disclosure, this draft provides systems and methods that provide the dynamic and adaptive carrying and encapsulation of traffic of certain technologies into other technologies, thus reducing the need of installing more physical infrastructure, and improving the resilience, redundancy, guaranteed delivery, and availability of communications.

Various aspects of the present disclosure provide systems and methods that transport the packets from different wireless access technologies to the premises (or other destination) of the provider (e.g., Wi-Fi provider, cellular provider vehicle network provider, etc.). The transport (or communication) of the packets may, for example, be achieved using all other available technologies while maintaining as much as possible of the original packet. The transport (or communication) provided depends on any of a variety of criteria. For example, the transport may depend on the level of integration that is performed with the wireless access technology, for example depending on which headers are contained in the packets received. Also for example, the transport may depend on the forwarding level used to transport the packets and the methods to be applied, such as encapsulation/decapsulation (or de-encapsulation) methods at layer 3 (IP) and/or layer 4 (UDP/TCP), or using IP routing for specific scenarios, etc.

Note that while various examples are presented herein in the context of TCP/IP layers, the scope of this disclosure is not limited to such layers. For example, the various aspects of this disclosure also apply to the layers of any of a variety of layered communication protocols.

Various parts of the present disclosure may refer to integration level. The integration level may, for example, be related to the TCP/IP layer from which the MAP (or OBU) or FAP (or RSU) receives the packets (e.g., from the different wireless access technologies). As discussed herein, depending on the integration method used and the network configuration, the packets received may contain headers from different layers. Two main example scenarios regarding the integration level, for example, include receiving packets with a layer 2 header included or packets with a layer 3 header included.

In an example scenario in which the received packets include a layer 2 header (and above), the MAP (or FAP) may forward such packets through encapsulation, for example maintaining all of the original headers, so the packet may be delivered to the provider as it was directly received from one of its stations/APs.

In an example scenario in which the received packets include a layer 3 header (and above), the MAP (or FAP) may forward such packets through encapsulation or routing, for example maintaining the original headers, so the packet may be delivered to the provider as a normal IP packet that flows in the Internet.

Various parts of the present disclosure may refer to forwarding level. The forwarding level may, for example, be related to the TCP/IP layer at which the received packets will be encapsulated to travel to the destination. For example, depending on the forwarding level used, the MAP (or FAP) may encapsulate the original packet with headers from different TCP/IP layers. In various scenarios, IP routing may be utilized instead of encapsulation, for example avoiding the extra IP header in the total size of the packet and the encapsulation/decapsulation process. Two main scenarios expected regarding the forwarding/encapsulation level, for example, include encapsulation with a layer 3 header (e.g., IP, etc.), or with layer 3+4 headers (e.g., IP and UDP/TCP, etc.).

In an example scenario in which the packets (e.g., all packets, etc.) received from a source are encapsulated with a layer 3 header (e.g., an IP header, etc.), the MAP (or FAP or other node) may add an IP header before the original headers of the packet (e.g., add an IP header before the layer 2 header of the packet coming from a layer 2 integration). In an example scenario, an Operating System (OS) may use predefined methods called IP-IP tunnels to implement the processes of encapsulating/decapsulating packets, while the routing may be performed by the developer.

In an example scenario in which the packets (e.g., all packets, etc.) received from a source are encapsulated with both layer 3 (e.g., IP, etc.) and layer 4 (e.g., UDP/TCP, etc.) headers, the MAP (or FAP or other node) may add an IP header and a UDP/TCP header to the headers of the original packet (e.g., add an IP header and a UDP header before the layer 3 header of the packet coming from a layer 3 integration). In an example scenario, the forwarding at layer 4 may be achieved through a predefined method called a Virtual Private Network (VPN), which may perform the encapsulations/decapsulation and routing (e.g., after being configured and set up).

Various parts of the present disclosure may refer to integration method. The integration method may, for example, be related to the manner in which the MAP (or FAP or other node) will provide the communication technology to the users. Two main types of integration methods (or integrations) in wireless access technologies may, for example, include a module built-in integration, in which the technology module is built-in (e.g., built into the O/S, the MAP, the FAP, or other node), or an external device integration, in which an external device that provides the technology is integrated through a network connection.

In an example scenario of a module built-in integration, there may be an integration of a module (e.g., a Wi-Fi card, LTE dongle, other built-in chip or card, stored software routine, etc.) in the Operating System, so there is an interface for the communication technology built into the OBU/AP that can be readily configured. Since the MAP (or FAP) is working directly with the module, there may for example be more freedom to adapt the operation of the module.

In an example scenario of an external device integration, there may be an integration of an external device that provides, among other things, the wireless technology desired. In this example scenario, the system may have characteristics of a network integration, for example since the external device may communicate with the MAP (or FAP or other node) via a network connection (e.g., an Ethernet connection, etc.). Since in this scenario, the MAP might not have full control of the external device there may be limitations in the integration and forwarding levels available.

The systems and methods provided herein provide for extensive flexibility in the utilization of one or more communication technologies to assist with communication utilizing one or more other (or same) technologies. Various non-limiting examples of such flexibility are provided herein.

In an example scenario (e.g., an LTE over LTE scenario), a vehicle (and/or a MAP thereof) may have a femtocell/picocell (or more than one) inside the vehicle to aggregate the traffic from all cellular mobile devices of the users on-board (or nearby) the vehicle. Such a femtocell/picocell may also be referred to herein as a vehicle cell. Note that the femtocell/picocell may be part of the MAP (or FAP or other node), or the femtocell/picocell may be a device separate from the MAP and networked to the MAP (e.g., via Ethernet, cable, optical link, etc.). In an example implementation, the femtocell/picocell may have a coverage area large enough to accommodate all users within a vehicle, all users within a particular distance of a vehicle (e.g., within 10 meters, within 20 meters, within 50 meters, within 100 meters, etc.). In an example implementation, the femtocell/picocell (e.g., of a MAP) may have a range generally matching that of the Wi-Fi coverage area of the MAP. The MAP may then use the available connections (e.g., DSRC, Wi-Fi, LTE, etc.) to forward all (or a selected portion of) cellular traffic from user cellular devices to the cellular (or telco) operator. Note that the MAP may have a plurality of cellular radios (e.g., operating on separate respective channels), for example simultaneously utilizing a first cellular radio for providing cellular links to users and utilizing a second cellular radio for providing one or more cellular links to a cellular base station. For example, the MAP may comprise one or more cellular radios positioned within a MAP housing. In various implementations, however, the MAP may comprise one or more communication ports (e.g., wired, optical, and/or wireless ports) through which to communicate with cellular radios, pico/femtocell devices, etc., which may be positioned outside a housing of the MAP and may be positioned in and/or on a same vehicle as the MAP.

There may, for example, be implementations or scenarios in which the MAP (or FAP or other node) generally has a cellular link from the same operator (or base station) as the mobile devices. Operation in accordance with various aspects of the present disclosure may still provide mobility and network management advantages. For example, all mobile devices inside (or near) the MAP may effectively perform handovers at the same time as the MAP. In other words, while all of the mobile devices are connected to the pico/femtocell (or vehicle cell) of the MAP, the MAP may handover from one cellular base station to another, while the mobile devices connected to the pico/femtocell (or vehicle cell) need not handover. Note that in such an implementation, a handover of the pico/femtocell (or vehicle cell) may be given higher priority handover service than a typical single-device handover. In such an implementation, it may be advantageous to move cellular connections to the vehicle pico/femtocell for only those mobile devices traveling with the MAP (e.g., within the vehicle), excluding those mobile devices near the vehicle that are not also traveling with the vehicle. For example, such movement with the vehicle may be determined by analyzing signal strength variation, accessing positioning information (e.g., GPS information, etc.) of the vehicle (or MAP) and of the mobile devices, utilizing signal triangulation to determine whether the mobile devices is within the vehicle, handing off cellular operation to the vehicle cell when a mobile device enters the vehicle and from the vehicle cell with a mobile device leaves the vehicle, etc. Note that in such an example implementation, cellular services may also be provided to mobile devices around the vehicle when the vehicle is not moving.

An example implementation having local cellular provider picocells/femtocells inside vehicles (or in MAPs, etc.), and/or in FAPs placed at fixed locations, may advantageously cover dead zones and provide fault-back for the cellular providers. For example, the MAP (or FAP or other node) may have the capability to establish connections with multiple cellular providers. Having small cells placed over a city, at least some of which can follow the movement of people or be close to the areas in need of the most communication service, will help manage the cellular spectrum and control the medium access. The traffic may, for example, be offloaded through different wired/wireless connections from the small local cells to the cellular provider, leaving the powerful cellular base stations free for utilization when needed most.

As discussed herein, the scenarios being presented can be applied to both MAPs (or OBUs) and FAPs (RSUs), as well as any of the other nodes discussed herein. For example, FAPs may provide a good point to offload data from a specific technology (e.g., from cellular to fiber, etc.). Note that FAPs may also support most of the OBUs functionalities, for example if it is desired to provide mobility support and a good user QoE when moving from a generally fixed location to a vehicle. For example, a user using a mobile cell device should be able to maintain a VoIP/phone call when moving from a bus stop (e.g., and being serviced by a FAP) and entering a bus (e.g., and being serviced by a MAP).

In another example scenario, instead of (or in addition to) the encapsulation and/or communication of LTE packets through DSRC and vice-versa, the systems and methods disclosed herein may provide for encapsulating Wi-Fi packets through LTE and/or DSRC, or using Wi-Fi to transport packets from LTE and/or DSRC. A MAP (or FAP or other node) may use any one or more of the available connections to forward traffic from a Wi-Fi service provider. The communication system with MAPs and/or FAPs may, for example, increase the coverage area of a Wi-Fi service provider, forwarding the traffic from the Wi-Fi users of MAPs (or FAPs or other nodes) to the premises of the Wi-Fi provider. For example, a MAP may provide the same Wi-Fi configuration(s) as the Wi-Fi provider does in their own APs, and then the MAP may use any of the available connections (e.g., LTE, DSRC, fiber, etc.) to forward the traffic.

Though many of the examples here are presented as being implemented in a MAP, the scope of this disclosure is not limited thereto. For example, any or all of such functionality may be performed by a FAP or any of the other nodes discussed herein, for example individually or in combination.

Figure 8:
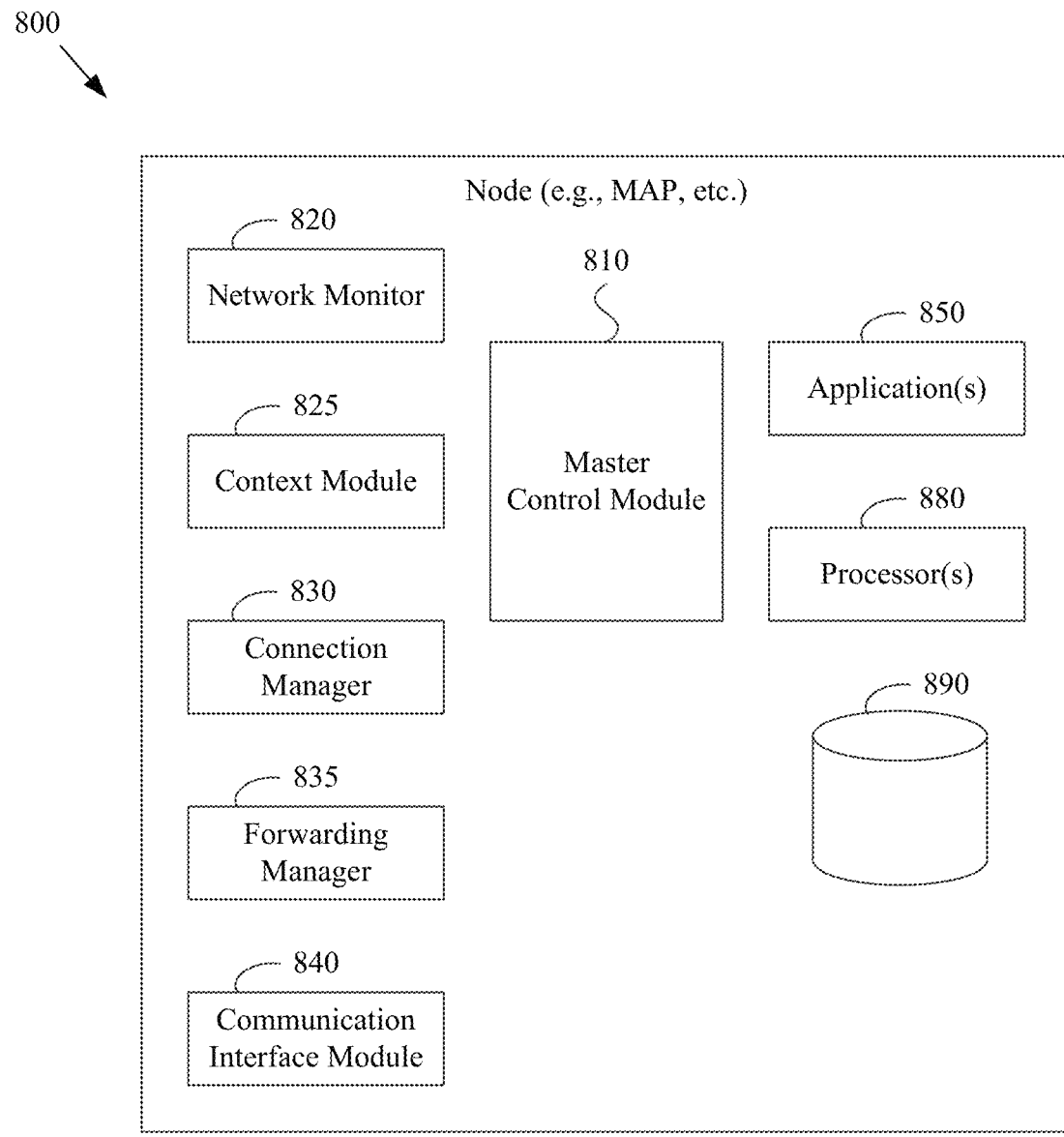
FIG. 8 shows a block diagram of an example communication network node, in accordance with various aspects of the present disclosure.

FIG. 8 shows a block diagram of an example communication network node (e.g., a Mobile AP or MAP, a Fixed AP or FAP, etc.) in accordance with various aspects of the present disclosure. The example node 800 may, for example, share any or all characteristics with the other example methods, method steps, nodes, node components, networks, and/or network components 100, 200, 300, 400, 500-570, 600, 700, 900, 1000, 1100, 1200, 1300, 1400, and 1500, discussed herein.

The example node 800 may, for example, comprise a Communication Interface Module 840 that operates to perform any or all of the wireless and/or wired communication functionality for the node 800, many examples of which are provided herein (e.g., communication with NCs, communication with Fixed AP nodes, communication with Mobile AP nodes, communication directly with client devices, backhaul or cellular communication, etc.). The Communication I/F module 840 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communications discussed herein between a Mobile AP and an NC, between a Mobile AP and a Fixed or Mobile AP, between a Mobile AP and a cellular base station, between a Mobile AP and a user device, between a Mobile AP and a sensor, etc., may be performed utilizing the Communication Interface Module 840. The Communication Interface Module 840 may, for example, comprise any or all of the radios discussed herein (e.g., wireless LAN radios, for example Wi-Fi radios, DSRC radios, cellular radios, etc.) and/or interface with such radios. Also note that, as discussed herein, the cellular radio(s) (e.g., a picocell or femtocell device) may be outside of the housing of the MAP, for example communicatively coupled to the MAP via a wired, optical, and/or wireless link.

The example node 800 also comprises a Network Monitor Module 820 (or block) that, for example, is responsible for monitoring the available interfaces from the same or different technologies, detecting the current conditions and quality of the connections or links (e.g., latency, jitter, packet loss, etc.), signal strength, availability, reliability, etc. The Network Monitor Module 820 may then, for example, communicate any or all of the context information (or metrics calculated therefrom) to the Context Module 825 (or block) for storage to be later accessed by the Connection Manager Module 830 (or block).

The example node 800 additionally comprises a Context Module 825 (or block). The Context Module 825 may, for example, manage the context information obtained by the Network Monitor Module 820. Note that such context information may also, for example, comprise any or all of the context information discussed herein (e.g., vehicle context information, communication network context information, node context information, etc.). The Context Module

825 may, for example, provide interfaces by which any of the other modules of the node 800 may access and/or store the context information.

The example node 800 further comprises a Connection Manager Module 830 (or block). The Connection Manager Module 830 may, for example, make any or all of the connection (or communicating) decisions discussed herein. For example, the Connection Manager Module 830 may be responsible for maintaining all of the available mechanisms to forward traffic from users to the provider premises and/or to receive traffic from the provider premises for the users, such as VPNs and IP tunnels (e.g., the user of which is discussed herein). The Connection Manager Module 830 may, for example, analyze the context information collected by the Network Monitor Module 820 (e.g., and obtained from the Context Module 825) to determine the integration and/or forwarding levels to be applied.

The example node 800 also comprises a Forwarding Manager Module 835 (or block). While the Connection Manager Module 830 may be generally responsible for determining the current connection(s), the Forwarding Manager Module 835 may, for example, be responsible for implementing (or enforcing) the forwarding mechanisms (e.g., utilizing and/or implementing the VPNs or IP tunneling for packets, etc.) for delivering the traffic to the premises of the provider. The Forwarding Manager Module 835 may, for example depending on the strategy determined by the Connection Manager Module 830 regarding integration and forwarding levels, apply the appropriate mechanisms to the packets. The Forwarding Manager Module 835 may, for example, utilize communication services provided by the Communication Interface Module 840 to perform various aspects of the forwarding.

The example node 800 may, for example, comprise a Master Control Module 810 that generally manages operation of the node 800 at a high level. Such Master Control Module 810 may, for example, comprise various aspects of an operating system for the node 800.

The example node 800 may further, for example, comprise one or more Applications 850 executing on the node 800 (e.g., networking monitoring applications, context storage and/or management applications, connection management operations, forwarding applications, client management applications, security applications, power management applications, vehicle monitoring applications, location services applications, user interface applications, etc.).

The example node 800 may also comprise one or more Processors 880 and Memory Devices 890. The Processor(s) 880 may, for example, comprise any of a variety of processor characteristics. For example, the Processor(s) 880 may comprise one or more of a general purpose processor, RIS processor, microcontroller, ASIC, DSP, video processor, co-processor, etc. The Memory Device(s) 890 may, for example comprise any of a variety of memory characteristics. For example, the Memory Device(s) 890 may comprise a volatile memory, non-volatile memory, etc. The Memory Device(s) 890 may, for example, comprise a non-transitory computer-readable medium that comprises software instructions that when executed by the Processor(s) 880, cause the node 800 to perform any or all of the functionality discussed herein.

As discussed herein, systems and methods in accordance with various aspects of this disclosure may perform data forwarding through LTE and/or DSRC communication technologies. For example, the use of pico/femtocells may benefit both the mobile operator and the consumer. For a mobile operator, the attractions of a femtocell are improvements to both coverage (e.g., indoors, in highly constrained urban environments, etc.) and capacity. Coverage may, for example, be improved because pico/femtocells can fill in the gaps and eliminate loss of signal through buildings. Capacity may, for example, be improved by a reduction in the number of phones attempting to use the same base station and also by the off-loading of traffic through the vehicle network directly to the operator's infrastructure. For example, instead of using the operator's private network (e.g., microwave links, etc.), the Internet may be used. Also, offloading traffic to pico/femtocells extends a networks physical coverage distance from each cellular network tower.

Figure 9:
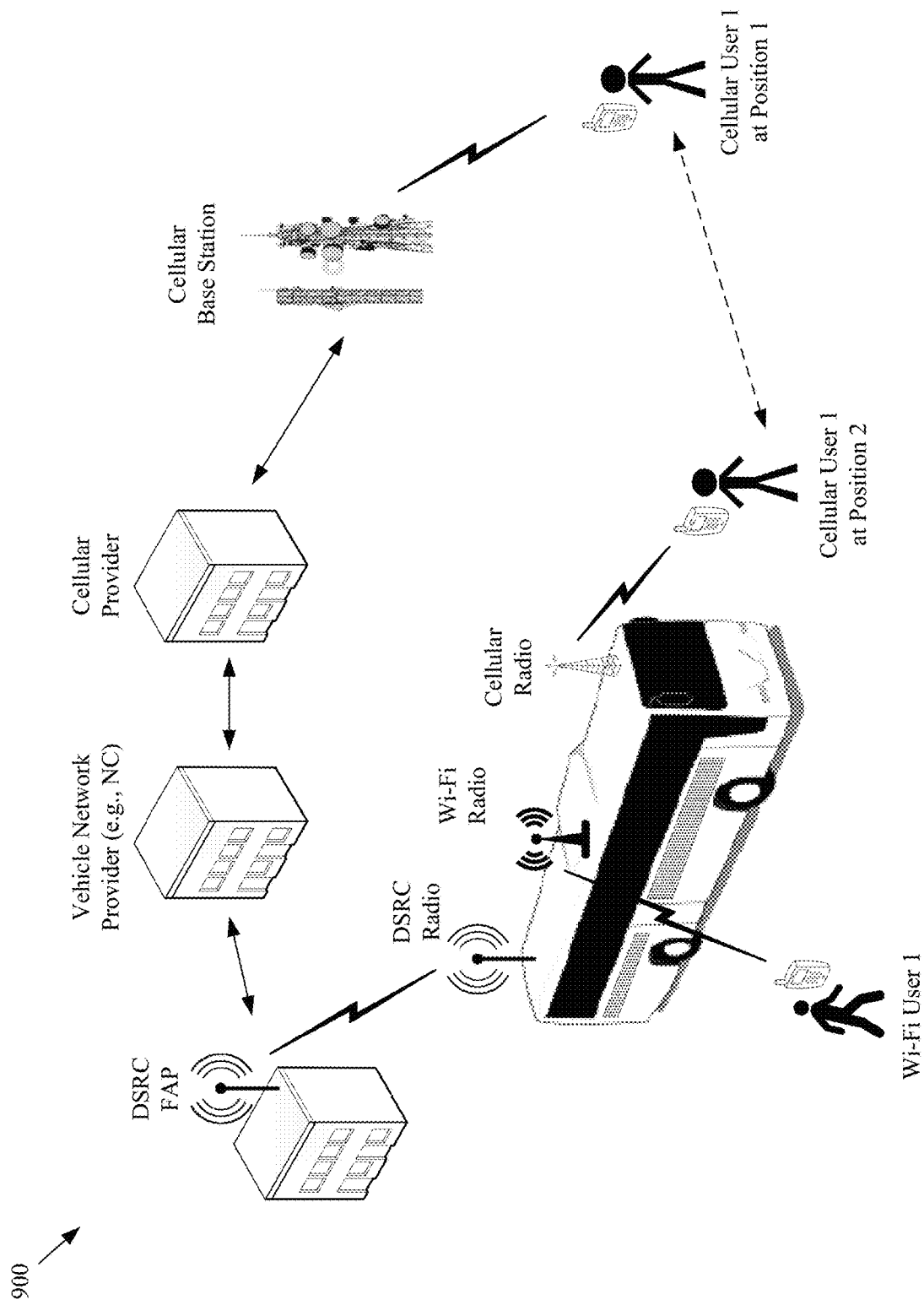
FIG. 9 shows a block diagram of an example communication network, in accordance with various aspects of the present disclosure.

FIG. 9 shows a block diagram of an example communication network, in accordance with various aspects of the present disclosure. The example network 900 may, for example, share any or all characteristics with the other example methods, method steps, nodes, node components, networks, and/or network components 100, 200, 300, 400, 500-570, 600, 700, 800, 1000, 1100, 1200, 1300, 1400, and 1500, discussed herein.

In the example scenario shown in FIG. 9, the cellular user is initially at position 1, and the user's mobile device communicates directly with the cellular base station, which communicates the packets with the cellular provider (e.g., via cable link, fiber link, microwave link, etc.). As the cellular user moves toward and/or enters the bus, the user's mobile device is handed over to the pico/femtocell cellular radio of the bus. At this point, the MAP of the bus may utilize the DSRC radio to wirelessly communicate the cellular packets of the user's mobile device to the FAP, which may then communicate (e.g., via wired, fiber, or wireless link) such packets to the cellular provider via the vehicle network provider infrastructure (e.g., network controllers, etc.). The reverse communication direction may, for example, be handled in a similar (or reversed) manner.

The mobile device of the Wi-Fi user may, for example, communicate with the MAP of the bus via the Wi-Fi radio. The MAP may similarly communicate the packets from the Wi-Fi user via DSRC and other links. Though FIG. 9 separates illustrates the DSRC Radio, the Wi-Fi Radio, and the Cellular Radio, as discussed herein, any or all of such radios may be integrated in a single Mobile AP. In another example scenario, the Wi-Fi Radio and the DSRC Radio may be integrated in a single Mobile AP, where the Mobile AP is communicatively coupled directly to the pico/femtocell cellular radio via wired (or optical) link and/or wirelessly.

Consumers and small businesses may, for example, benefit from greatly improved coverage and signal strength since they have a de facto physical base station inside their premises (or vehicles). For example, as a result of being relatively close to the pico/femtocell radio, the mobile phone (or other user equipment) requires significantly less power for communication with such radio relative to communicate with the standard cellular base station, thus increasing battery life. The user(s) may also experience better voice quality, for example depending on any one or more of a number of factors such as operator/network support, customer contract/price plan, phone and operating system support, etc. Some carriers (or providers) may also offer more attractive tariffs, for example discounted calls from home. The use of unlicensed spectrum technologies such as DSRC to provide a mobile and adaptive backhaul for those pico/femtocells is a solution that provides for mobile small cells that support a significant number of users (e.g., some or all of the users inside each bus/subway/train) by moving with them to avoid extra handoff processes between cells.

In another example scenario, in a high density traffic area, multiple vehicles and infrastructure systems may contend for the constrained DSRC bandwidth and channels assigned/ reserved for Emergency/Safety information transmission, thus limiting the amount of bandwidth available per user. The DSRC range is also relatively limited and many dead zones may exist even along a short path. Such limitations may, for example, be overcome by carrying DSRC data encapsulated in other formats (e.g., LTE, etc.). Such operation may, for example, enhance or ensure link reliability when sending data not only between vehicles but also to the infrastructure and cloud services.

Figure 10:
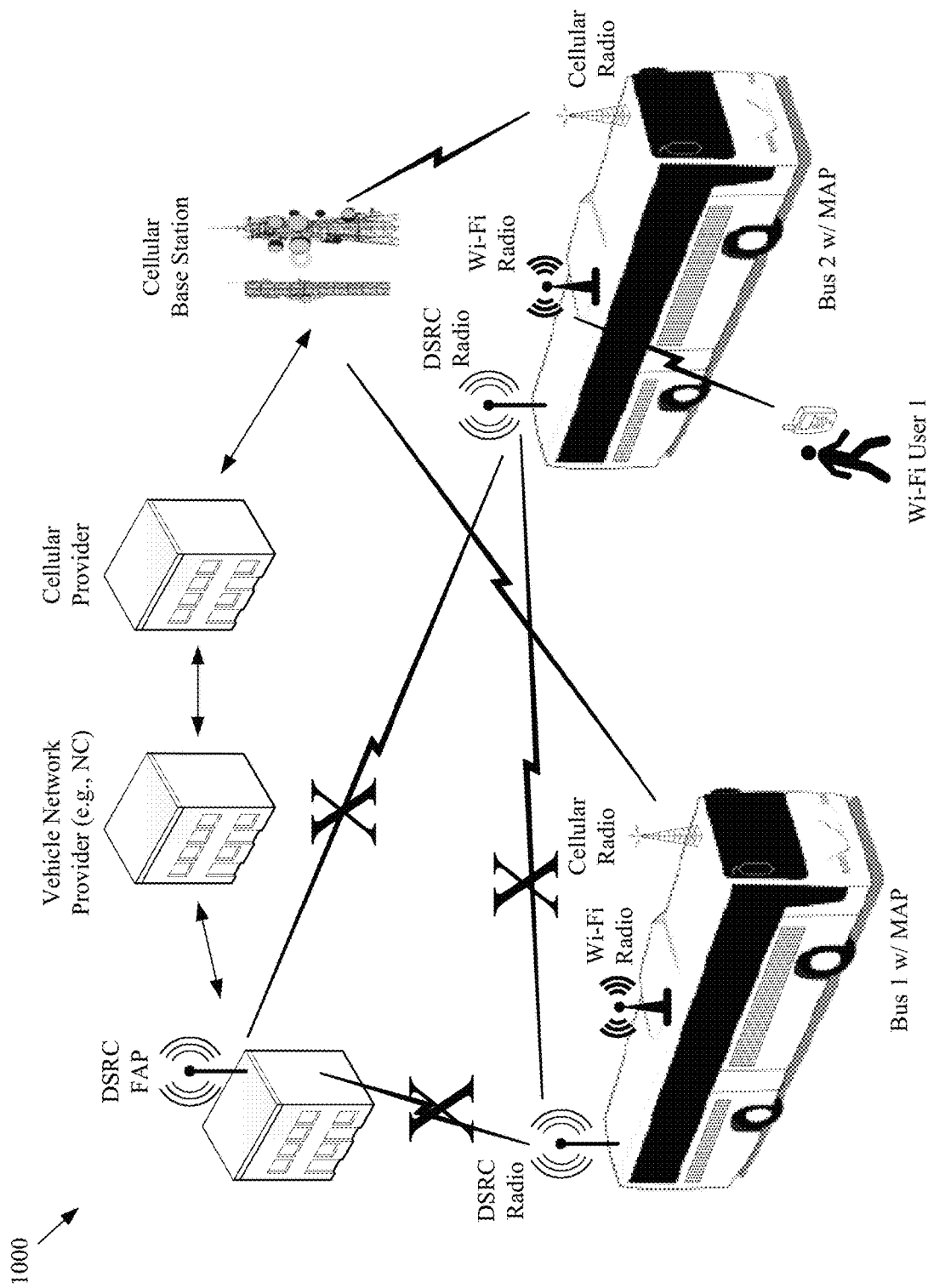
FIG. 10 shows a block diagram of an example communication network, in accordance with various aspects of the present disclosure.

FIG. 10 shows a block diagram of an example communication network, in accordance with various aspects of the present disclosure. The example network 1000 may, for example, share any or all characteristics with the other example methods, method steps, nodes, node components, networks, and/or network components 100, 200, 300, 400, 500-570, 600, 700, 800, 900, 1100, 1200, 1300, 1400, and 1500, discussed herein.

In the example scenario of FIG. 10, the DSRC links to the MAPs of the buses are at least temporarily unavailable. The MAPs thus utilize cellular radios to communicate with the cellular base station, which then may utilize various communication links (e.g., cable links, fiber links, microwave links, etc.) to communicate the packets to the cellular provider and then to the vehicle network provider. For example, the Wi-Fi User (or mobile device thereof) communicates with the MAP via Wi-Fi link, but since the DSRC link(s) are down, the MAP then communicates the packets from the Wi-Fi User to the vehicle network provider (and/or the Internet) via the cellular radio of the vehicle (or MAP), via the cellular base station, and via the cellular provider premises.

Note that the connection between MAPs (or other nodes) and NCs may be multi-homed through different interfaces and/or technologies, the following examples use single connections just for simplicity but multi-homed connections apply as well. Non-limiting of such multi-homed operation are provided in U.S. Provisional Patent Application No. 62/439,257, filed on Dec. 27, 2016, and titled "Systems and Methods for the Flexible Support of Multi-Homing in a Network of Moving Things," the entire contents of which are hereby incorporated herein by reference for all purposes.

In an example implementation, systems and methods implemented in accordance with various aspects of this disclosure may communicate LTE packets over DSRC. For example, the MAPs (or other nodes) can provide the backhaul for the pico/femtocells. The cellular user may, for example, roam from the regular base station cell to the pico/femtocell. From the point of view of the user device, it is being connected in another regular cell. The traffic from the cellular user may then be transmitted through the pico/ femtocell, and then such traffic is delivered to the cellular provider network. Such traffic delivery may be performed in various manners, non-limiting examples of which are provided herein.

For example, a first manner may comprise utilizing L2 or L3 VPN (e.g., TAP or virtual Ethernet adapter, TUN or virtual point-to-point IP link, etc.). For example, the pico/ femtocell may have an embedded client that enables it to connect to the cellular provider home network as long as it has an Internet backhaul, which in this case may be provided by the MAP and the vehicle network. This first manner may, for example, require relatively less management than other manners, but may also have relatively higher overhead.

Figure 11:
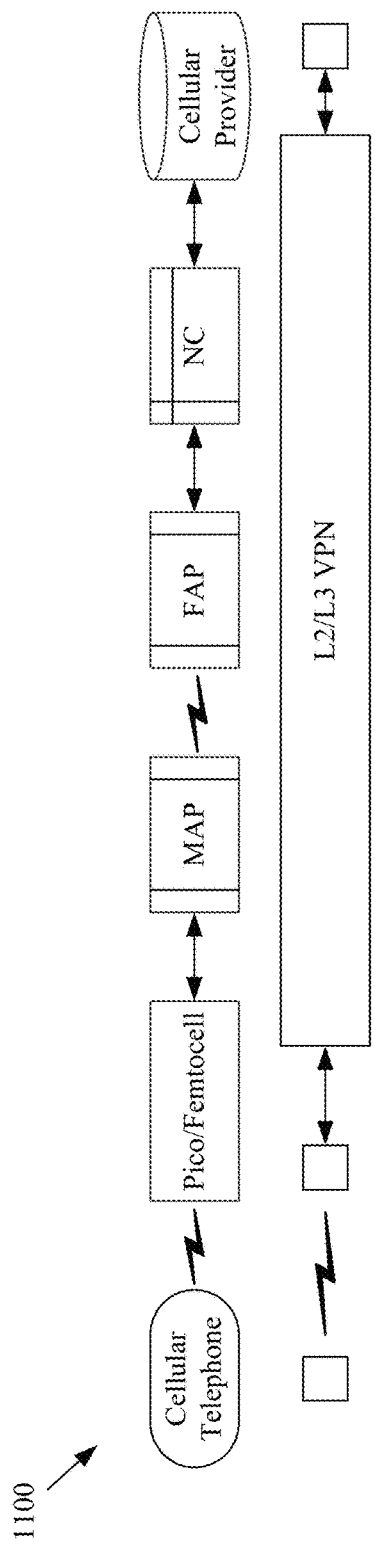
FIG. 11 shows a block diagram of an example communication technique, in accordance with various aspects of the present disclosure.

An example implementation is provided by FIG. 11, which shows a block diagram of an example communication technique, in accordance with various aspects of the present disclosure. The example communication technique 1100 (or method) may, for example, share any or all characteristics with the other example methods, method steps, nodes, node components, networks, and/or network components 100, 200, 300, 400, 500-570, 600, 700, 800, 900, 1000, 1200, 1300, 1400, and 1500, discussed herein.

For example, the cellular telephone may communicate packets wirelessly with the pico/femtocell utilizing LTE. The pico/femtocell (or MAP) may then utilize the L2/L3 VPN to communicate the LTE packets through the vehicle network and ultimately to the cellular provider. Note that the various aspects of the present disclosure apply in both the forward and reverse communication directions.

Also for example, a second manner may comprise utilizing L2 or L3 traffic encapsulation, which may for example comprise the NC forwarding the traffic directly to the cellular provider network either through L3 routing or through an L2 shared domain. For example, the traffic may be encapsulated between the MAP and the NC and then delivered to the cellular provider network. This second example manner may, for example, utilize dedicated connections between NC(s) and the cellular provider(s). Such connection may, for example, be relatively difficult to acquire but may ultimately result in the utilization of less overhead than with the first example manner discussed above.

Figure 12:
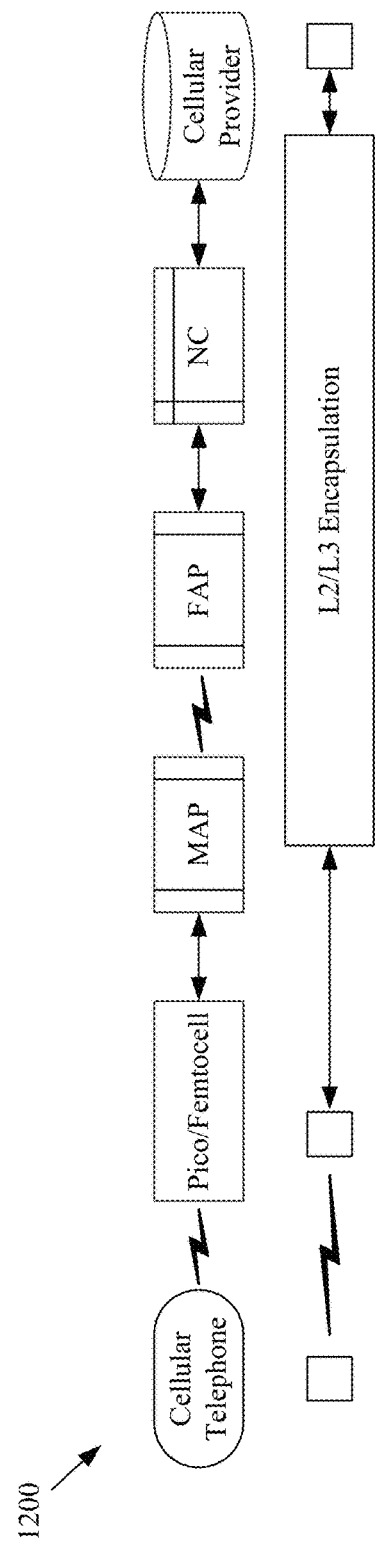
FIG. 12 shows a block diagram of an example communication technique, in accordance with various aspects of the present disclosure.

An example implementation is provided by FIG. 12, which shows a block diagram of an example communication technique, in accordance with various aspects of the present disclosure. The example communication technique 1200 (or method) may, for example, share any or all characteristics with the other example methods, method steps, nodes, node components, networks, and/or network components 100, 200, 300, 400, 500-570, 600, 700, 800, 900, 1000, 1100, 1300, 1400, and 1500, discussed herein.

For example, the cellular telephone may communicate packets wirelessly with the pico/femtocell utilizing LTE. The pico/femtocell (or MAP) may then utilize L2/L3 encapsulation (as discussed herein) to communicate the LTE packets through the vehicle network and ultimately through the cellular provider. Note that the various aspects of the present disclosure apply in both the forward and reverse communication directions.

In another example implementation, systems and methods implemented in accordance with various aspects of this disclosure may communicate DSRC packets over LTE. For example, the MAPs (or OBUs) may have an on-board or external cellular radio that enables them to use the cellular network. For example, when a MAP is out of the range of the DSRC APs (e.g., FAPs, other MAPs, etc.) or the DSRC link is not stable enough, the MAP can use the cellular network as a backhaul. The traffic generated by the MAP (or any component thereof, any component communicatively coupled thereto, etc.), as well as the traffic generated by the users using the Wi-Fi services provided by the MAP, is forwarded to the NC. Such forwarding may be performed in any of a variety of manners, non-limiting examples of which are provided herein.

For example, a first manner may comprise utilizing L2 or L3 (TAP or TUN) VPN. For example, the MAP may have a VPN client that enables it to connect through the NC, while for the cellular provider this may be seen as regular Internet traffic. This example manner may, for example, require relatively less management then other manners, but may also have higher overhead.

Figure 13:
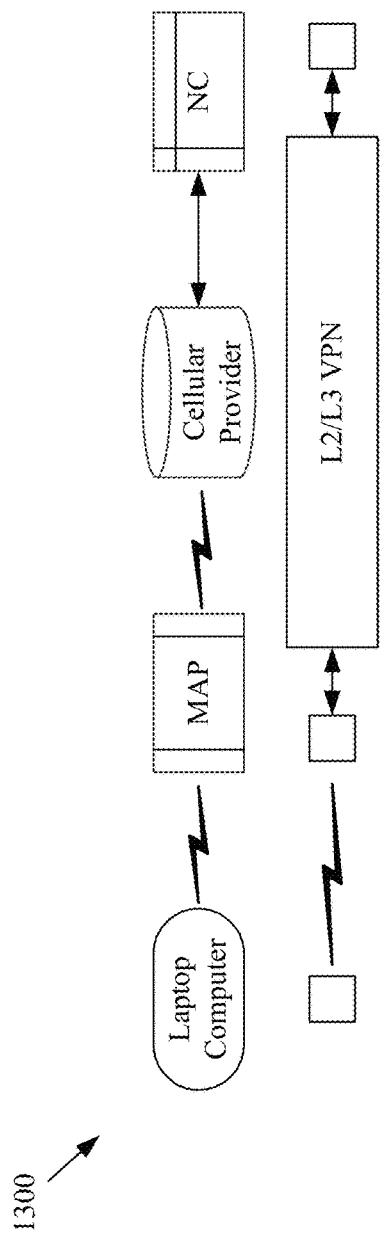
FIG. 13 shows a block diagram of an example communication technique, in accordance with various aspects of the present disclosure.

An example implementation is provided by FIG. 13, which shows a block diagram of an example communication technique, in accordance with various aspects of the present disclosure. The example communication technique 1300 (or method) may, for example, share any or all characteristics with the other example methods, method steps, nodes, node components, networks, and/or network components 100, 200, 300, 400, 500-570, 600, 700, 800, 900, 1000, 1100, 1300, 1400, and 1500, discussed herein.

For example, the laptop computer (or smartphone, etc.) may communicate packets wirelessly with the MAP utilizing Wi-Fi. The MAP may then utilize the L2/L3 VPN to communicate the DSRC packets through the cellular network and ultimately to the vehicle network provider or node thereof (e.g., to an NC node, etc.). Note that the various aspects of the present disclosure apply in both the forward and reverse communication directions.

Also for example, a second manner may comprise utilizing L2 or L3 traffic encapsulation, which may for example comprise the MAP forwarding the traffic directly to the NC by forwarding it through the cellular network. For example, the MAP and the NC may have public IP addresses, or for example the cellular provider network may have a shared L2 domain with the NC so that the NCs and the MAPs can communicate directly through the cellular network. This second manner may, for example, utilize dedicated connections between NC(s) and cellular provider(s), or Public IP addresses on both MAPs and NCs. Such connections and/or addressing may, for example, be relatively harder to get but may ultimately result in the utilization of less overhead than with the first example manner discussed above.

Figure 14:
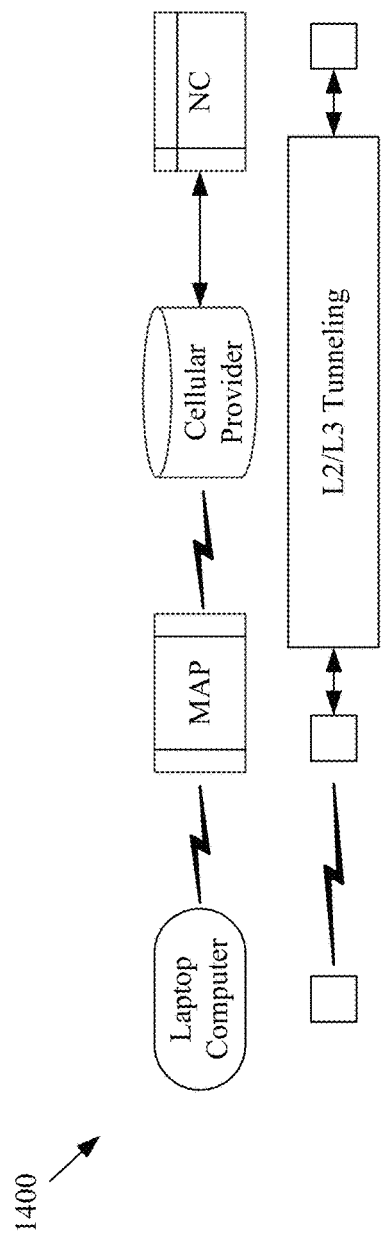
FIG. 14 shows a block diagram of an example communication technique, in accordance with various aspects of the present disclosure.

An example implementation is provided by FIG. 14, which shows a block diagram of an example communication technique, in accordance with various aspects of the present disclosure. The example communication technique 1200 (or method) may, for example, share any or all characteristics with the other example methods, method steps, nodes, node components, networks, and/or network components 100, 200, 300, 400, 500-570, 600, 700, 800, 900, 1000, 1100, 1300, 1400, and 1500, discussed herein.

For example, the laptop computer (or smartphone, etc.) may communicate packets wirelessly with the MAP utilizing Wi-Fi. The MAP may then utilize L2/L3 Tunneling (as discussed herein) to communicate DSRC packets through the cellular network and ultimately to the vehicle network provider or node thereof (e.g., to an NC node, etc.). Note that the various aspects of the present disclosure apply in both the forward and reverse communication directions.

Referring back to the example node 800 of FIG. 8, as discussed herein, the Network Monitor Node 820 may monitor the available communication technologies, detecting the current conditions and quality of the connections or links (e.g., latency, jitter, packet loss, etc.), signal strength, available cellular/LTE base stations, etc.

The Connection Manager Module 830, as discussed herein, may for example make any or all of the connection (or communicating) decisions discussed herein. For example, the Connection Manager Module 830 may decide when to continue using the standard technology (e.g., normal DSRC or LTE routing), when to use the backup technology (e.g., encapsulate or communicate DSRC over LTE, encapsulate or communicate LTE over DSRC, etc.), and/or when to return to default (or standard) operation.

The Connection Manager Module 830 (or other module of the node 800 or network) may, for example, decide to encapsulate (or communicate) DSRC into (or utilizing) LTE in any one or more of a variety of circumstances, non-limiting examples of which are provided herein. For example, the Connection Manager Module 830 may determine to encapsulate (or communicate) DSRC into (or utilizing) LTE when: there are DSRC APs nearby but they indicate that their capacity is already at the maximum; there are DSRC APs nearby but when trying to communicate with them the connection is unstable with high jitter and/or packet loss; there are nearby vehicles unreachable through DSRC and the node needs to share critical content with such vehicles (e.g., safety warnings, etc.); when the node wants to broadcast a message to the entire fleet (e.g., safety warnings, etc.); when the node desires or needs to send data with higher required throughput than that available in DSRC, but the node can multi-home between the available DSRC and LTE connections; when there are DSRC APs in the area but the traffic sent to them is unable to reach the destination; etc.

Also for example, the Connection Manager 830 (or other module of the node 800 or network) may, for example, decide to encapsulate (or communicate) LTE over (or utilizing) DSRC whenever there is an available DSRC AP and in any one or more of a variety of circumstances, non-limiting examples of which are provided herein. For example, the Connection Manager Module 830 may determine to encapsulate (or communicate) LTE over (or utilizing) DSRC when: the location is designated as requiring such operation (e.g., a geographical area may be designated as always or at any particular moment requiring such operation if available); the coverage of the base station available in the area is insufficient; the capacity of the base station available in the area is insufficient; the cellular connection provided by the base station available in the area is unstable (high jitter/latency/packet loss); etc. Such factors may be considered when determining whether to handover the vehicle cell (or pico/femtocell) to and/or from a cellular communication network, a vehicle communication network, a Wi-Fi communication network, etc.

The Context Module 825 may, for example, measure (or obtain information regarding) the context nearby (e.g., obtained from Cloud, nearby APs, vehicles nearby, etc.), preferences of users in terms of technology preferences from users or telcos, etc. The Context Module 825 may, for example, query the available APs about number of nodes actually communicating through them and available bandwidth; query the surrounding MAPs about network conditions in order to also evaluate the path ahead; receive information from the Cloud or other nodes identifying user/telcos preferences regarding network usage in that given area so that it can comply; etc.

The Forwarding Manager Module 835 may, for example as discussed herein, be responsible for implementing (or enforcing) the forwarding mechanisms (e.g., utilizing and/or implementing the VPNs or IP tunneling for packets, etc.) for delivering the traffic to the premises of the provider. For example, in various example scenario, the Forwarding Manager Module 835 may mark the data collected and messages sent to the Cloud/NC through the cellular connection, so that such data and/or messages can then: be forwarded to a specific neighbor of the source node, if for example two vehicles nearby still cannot communicate directly due to radio congestion or interference; be broadcast to all nodes nearby the source of the information (since the DSRC links may be overwhelmed these warning messages can be shared in a specific area using the cellular connection); and be broadcasted to all nodes (e.g., in case of a catastrophic event, etc.).

Though various illustrative examples have been provided, many others exist. For example, there are several other examples using any or all of the available technologies, where the MAP (or FAP or other node) can provide the desired mechanisms for integration and forwarding.

One of such examples may comprise DSRC over Wi-Fi. For example, when two vehicles with MAPs (or OBUs) are parked close to the same Wi-Fi AP, they (or their respective MAPs) can use Wi-Fi to transport packets from DSRC. Moreover, if there are FAPs with a Wi-Fi backhaul, when a MAP is within the range of such a FAP, the MAP and FAP can communicate using DSRC and then the FAP may forward the packets through Wi-Fi to another FAP.

Another of such examples may comprise LTE over Wi-Fi. For example, when a vehicle with a MAP (e.g., including a pico/femtocell) stops/parks close to a Wi-Fi AP, the MAP can forward LTE packets from the pico/femtocell through the Wi-Fi connection. Another scenario may comprise a FAP with a pico/femtocell that forwards the packets from the pico/femtocell through a Wi-Fi backhaul connection.

An additional example may comprise Wi-Fi over DSRC. For example, when a vehicle with a MAP is expanding the Wi-Fi coverage of a Wi-Fi provider, the MAP can forward the packets through a DSRC connection and deliver the packet to the provider premises. In the case of a FAP providing Wi-Fi from a provider, the FAP can forward the Wi-Fi packet through DSRC to a neighbor FAP if the wired backhaul fails or is overloaded.

Another example may comprise Wi-Fi over LTE. For example, a vehicle with a MAP (e.g., including a pico/femtocell) can forward the packets from the pico/femtocell through one or more LTE connections from the same or different provider. The MAP may also have an LTE connection to forward packets from the Wi-Fi network when there are no more backhaul connections or if there is any failure/overload in the wired backhaul.

A further example may comprise LTE over LTE. For example, a vehicle with a MAP (e.g., including a pico/femtocell) can forward packets from the users connected to the pico/femtocell through an LTE connection of the same provider, for example to improve the management and the interference utilizing a hierarchical approach. The MAP can also forward the traffic from the pico/femtocell through one or more LTE connections of other cellular providers, for example to overcome congestion and dead-zones.

As discussed herein, the scope of this disclosure should not be limited by characteristics of any of the particular examples provided herein.

Figure 15:
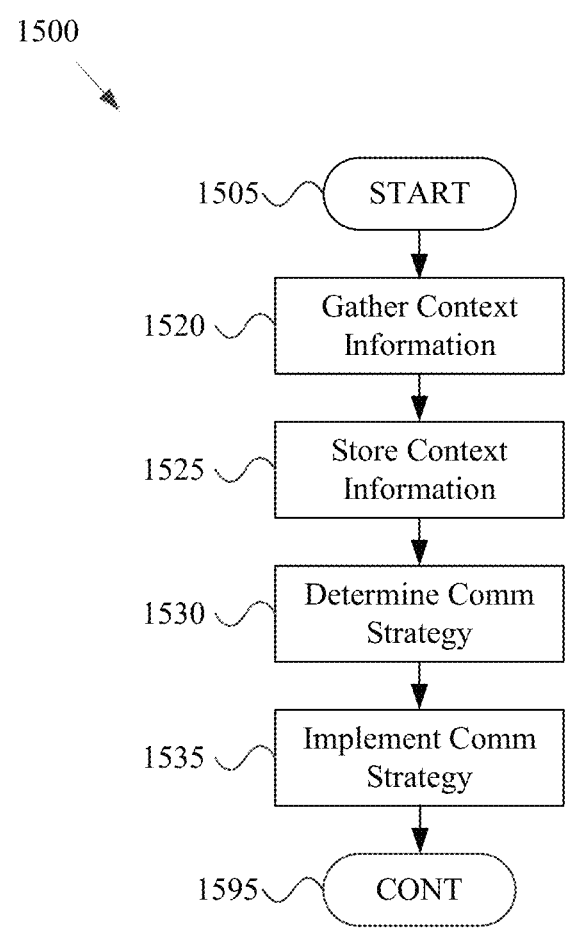
FIG. 15 shows a flow diagram of an example method for communicating, in accordance with various aspects of the present disclosure.

FIG. 15 shows a flow diagram of an example method for communicating, in accordance with various aspects of the present disclosure. The example method 1500 may, for example, share any or all characteristics with the other example methods, method steps, nodes, node components, networks, and/or network components 100, 200, 300, 400, 500-570, 600, 700, 800, 900, 1000, 1100, 1200, 1300, and 1400, discussed herein.

The example method 1500 may, for example at block 1520, comprise gathering context information. Block 1520 may, for example, share any or all functional characteristics with the Network Monitor Module 820 discussed herein. Block 1520 may, for example, comprise gathering any or all context information discussed herein.

The example method 1500 may, for example at block 1525, comprise storing and/or managing context information. Block 1525 may, for example, share any or all functional characteristics with the Context Module 825 discussed herein. Block 1525 may, for example, comprise storing and/or managing (e.g., receiving, making accessible, etc.) any or all context information discussed herein.

The example method 1500 may, for example at block 1530, comprise determining communication strategy. Block 1530 may, for example, share any or all functional characteristics with the Connection Manager Module 835 discussed herein. Block 1530 may, for example, comprise determining the manner in which any or all of the communications discussed herein are performed (e.g., encapsulating, virtual private networking, tunneling, etc.).

The example method 1500 may, for example at block 1535, comprise implementing the communication strategy. Block 1535 may, for example, share any or all functional characteristics with the Forwarding Manager Module 835 discussed herein. Block 1535 may, for example, comprise implementing (or enforcing) the communication strategy identified at block 1530.

Systems and methods implemented in accordance with various aspects of this disclosure provide many benefits. For example, by combining (or flexibly aggregating) the available communication technologies it is possible to overcome some limitations of each one, leveraging the systems already deployed on the vehicles (e.g., in the MAPs) as well as the FAPs, improving the overall end user QoE, not only when accessing the Internet through Wi-Fi but also when making regular cellular telephone calls. The utilization of the available technologies to provide the connection and transport to a third technology provide for better resource management regarding wireless medium access and network infrastructure. Also, the utilization of all of the available technologies as fault-back among them facilitates the maintenance and improves the management of the network As the industry moves forward into 5G communication and beyond, the integration of all available heterogeneous networks will become increasingly important and valuable. Thus, over time, there will be more and more access network technologies, and the systems and methods provided herein will be able to use such technologies to overcome the limitations of the others. For example, such system and methods are able to utilize one available technology to transport the packets of other, such as using DSRC or Wi-Fi to transport packets from LTE users, using LTE to transport packets from Wi-Fi or DSRC users, etc.

Among other things, the systems and methods provided herein may be beneficially utilized by telecommunication companies, to fill gaps of the LTE technology by encapsulating (or communicating) LTE packets wholly or partially in other available spectrum (e.g., the unlicensed spectrum, etc.), for example over DSRC (e.g., LTE over vehicular mesh), and receiving/de-encapsulating the traffic without substantial additional overhead.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for integrating and exploiting the availability of multiple communication technologies in a network of moving things, for example including a network of autonomous vehicles. As a non-limiting example, various aspects of this disclosure provide for the flexible utilization of one or more communication pathways available to nodes in a vehicle network based, at least in part, on real-time context. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A Mobile Access Point (MAP) for a vehicle communication network, the MAP comprising:
 a plurality of radios; and
 at least one module comprising a processor and memory, wherein the at least one module is operable to, at least:
  utilize a first radio of the plurality of radios to provide cellular communications to a client device by, at least in part, operating to establish a direct cellular communication link with the client device;
  determine a geographical location of the MAP;
  determine, based at least in part on the determined geographical location, to utilize a second radio of the plurality of radios to communicate the provided cellular communications with an infrastructure station of a wireless wide area network (WWAN); and
  utilize the second radio to communicate the provided cellular communications with the infrastructure station of the WWAN.

2. The Mobile Access Point (MAP) of claim 1, wherein the at least one module is operable to provide wireless local area network (WLAN) services to client devices while the MAP is moving.

3. The Mobile Access Point (MAP) of claim 2, wherein:
 the WWAN comprises a cellular communication network; and
 the at least one module is operable to provide the WLAN services by, at least in part, operating to communicate WLAN communications through the cellular communication network by, at least in part operating to utilize Layer 2 and/or Layer 3 tunneling through the cellular communication network between the MAP and a network controller of a vehicle communication network.

4. The Mobile Access Point (MAP) of claim 1, wherein the WWAN comprises a vehicle communication network.

5. The Mobile Access Point (MAP) of claim 4, wherein the at least one module is operable to communicate the provided cellular communications through the vehicle communication network by, at least in part, operating to utilize Layer 2 and/or Layer 3 encapsulation through the vehicle communication network between at least the MAP and a cellular provider.

6. The Mobile Access Point (MAP) of claim 1, wherein the WWAN comprises a cellular communication network.

7. The Mobile Access Point (MAP) of claim 6, wherein the first radio comprises a first cellular communication network radio that operates to communicate directly with the client device, and the second radio comprises a second cellular communication network radio that operates to communicate directly with a base station of the cellular communication network.

8. The Mobile Access Point (MAP) of claim 7, wherein the at least one module is operable to, while maintaining the provided cellular communications between the first radio and the client device, including the established direct cellular communication link with the client device, handover communication of the provided cellular communications between the second radio and the base station to a second base station of the cellular communication network.

9. A Mobile Access Point (MAP) for a vehicle communication network, the MAP comprising:
a plurality of radios; and
at least one module comprising a processor and memory, wherein the at least one module is operable to, at least:
utilize a first radio of the plurality of radios to provide cellular communications to a client device by, at least in part, operating to establish a direct cellular communication link with the client device; and
utilize a second radio of the plurality of radios to communicate the provided cellular communications with an infrastructure station of a wireless wide area network (WWAN);
determine whether the client device is traveling with and/or positioned within a vehicle associated with the MAP; and
determine to provide the cellular communications to the client device based, at least in part, on the determination of whether the client device is traveling with and/or positioned within the vehicle associated with the MAP.

10. The Mobile Access Point (MAP) of claim 9, wherein the at least one module is operable to determine whether the client device is traveling with and/or positioned within the vehicle associated with the MAP based, at least in part, on positioning information.

11. The Mobile Access Point (MAP) of claim 9, wherein the at least one module is operable to determine whether the client device is traveling with and/or positioned within the vehicle associated with the MAP based, at least in part, on signal strength and/or on signal triangulation.

12. The Mobile Access Point (MAP) of claim 9, wherein:
the WWAN comprises a cellular communication network;
the first radio comprises a first cellular communication network radio that operates to communicate directly with the client device; and
the second radio comprises a second cellular communication network radio that operates to communicate directly with a base station of the cellular communication network.

13. The Mobile Access Point (MAP) of claim 12, wherein the at least one module is operable to, while maintaining the provided cellular communications between the first radio and the client device, including the established direct cellular communication link with the client device, handover communication of the provided cellular communications between the second radio and the base station to a second base station of the cellular communication network.

14. The Mobile Access Point (MAP) of claim 9, wherein the at least one module is operable to receive a handover of the client device from a cellular communication network base station to the second radio of the MAP when the client device enters the vehicle.

15. The Mobile Access Point (MAP) of claim 9, wherein the at least one module is operable to handover the client device from the second radio of the MAP to a cellular communication network base station when the client device exits the vehicle.

16. A Mobile Access Point (MAP) for a vehicle communication network, the MAP comprising:
a plurality of radios; and
at least one module comprising a processor and memory, wherein the at least one module is operable to, at least:
utilize a first radio of the plurality of radios to provide cellular communications to a client device by, at least in part, operating to establish a direct cellular communication link with the client device; and
selectively, at least:
utilize a second radio of the plurality of radios to communicate the provided cellular communications with an infrastructure station of a wireless wide area network (WWAN);
utilize a third radio of the plurality of radios to communicate the provided cellular communications, including data communicated over the direct cellular communication link with the client device, with an access point of a wireless local area network (WLAN);
determine a geographical location of the MAP; and
determine, based at least in part on the determined geographical location, to utilize the second radio of the plurality of radios to communicate the provided cellular communications with the infrastructure station of the WWAN.

17. The Mobile Access Point (MAP) of claim 16, wherein the at least one module is operable to:
determine whether the client device is traveling with and/or positioned within a vehicle associated with the MAP; and
determine to provide the cellular communications to the client device based, at least in part, on the determination of whether the client device is traveling with and/or positioned within the vehicle associated with the MAP.

18. The Mobile Access Point (MAP) of claim 16, wherein:
the at least one module is operable to provide wireless local area network (WLAN) services to client devices while the MAP is moving;
the WWAN comprises a cellular communication network; and
the at least one module is operable to provide the WLAN services by, at least in part, operating to communicate WLAN communications through the cellular communication network by, at least in part operating to utilize Layer 2 and/or Layer 3 tunneling through the cellular communication network between the MAP and a network controller of a vehicle communication network.

19. The Mobile Access Point (MAP) of claim 16, wherein:
the WWAN comprises a vehicle communication network;
the at least one module is operable to communicate the provided cellular communications through the vehicle communication network by, at least in part, operating to utilize Layer 2 and/or Layer 3 encapsulation through the vehicle communication network between at least the MAP and a cellular provider.

20. A Mobile Access Point (MAP) for a vehicle communication network, the MAP comprising:

a plurality of radios; and at least one module comprising a processor and memory, wherein the at least one module is operable to, at least:

utilize a first radio of the plurality of radios to provide cellular communications to a client device by, at least in part, operating to establish a direct cellular communication link with the client device; and selectively, at least:

utilize a second radio of the plurality of radios to communicate the provided cellular communications with an infrastructure station of a wireless wide area network (WWAN);

utilize a third radio of the plurality of radios to communicate the provided cellular communications, including data communicated over the direct cellular communication link with the client device, with an access point of a wireless local area network (WLAN);

determine whether the client device is traveling with and/or positioned within a vehicle associated with the MAP; and determine to provide the cellular communications to the client device based, at least in part, on the determination of whether the client device is traveling with and/or positioned within the vehicle associated with the MAP.

21. The Mobile Access Point (MAP) of claim 20, wherein:

the at least one module is operable to provide wireless local area network (WLAN) services to client devices while the MAP is moving;

the WWAN comprises a cellular communication network; and the at least one module is operable to provide the WLAN services by, at least in part, operating to communicate WLAN communications through the cellular communication network by, at least in part operating to utilize Layer 2 and/or Layer 3 tunneling through the cellular communication network between the MAP and a network controller of a vehicle communication network.

22. The Mobile Access Point (MAP) of claim 20, wherein:

the WWAN comprises a vehicle communication network;

the at least one module is operable to communicate the provided cellular communications through the vehicle communication network by, at least in part, operating to utilize Layer 2 and/or Layer 3 encapsulation through the vehicle communication network between at least the MAP and a cellular provider.

* * * * *